United States Patent
Joyce et al.

(10) Patent No.: US 9,645,707 B1
(45) Date of Patent: May 9, 2017

(54) ALTERNATIVE VIEW-BASED NAVIGATION

(71) Applicant: EMC Corporation, Hopkinton, MA (US)

(72) Inventors: Scott E. Joyce, Foxboro, MA (US); Timothy Cox, Mendon, MA (US); Donald Labaj, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 672 days.

(21) Appl. No.: 14/104,250

(22) Filed: Dec. 12, 2013

(51) Int. Cl.
*G06F 3/0482* (2013.01)
(52) U.S. Cl.
CPC .................. *G06F 3/0482* (2013.01)
(58) Field of Classification Search
CPC ............. G06F 17/30873; G06F 3/0482; G06F 17/30994
USPC ........................... 715/738, 853, 854; 707/769
See application file for complete search history.

(56) References Cited

U.S. PATENT DOCUMENTS

| 5,873,064 | A * | 2/1999 | De Armas | G06F 9/45512 |
| | | | | 704/275 |
| 7,711,813 | B1 * | 5/2010 | Yehuda | G06F 3/0604 |
| | | | | 709/224 |
| 2007/0124701 | A1 * | 5/2007 | Gong | G06F 17/30873 |
| | | | | 715/854 |
| 2009/0204900 | A1 * | 8/2009 | Champion | G06F 3/0482 |
| | | | | 715/738 |
| 2010/0050131 | A1 * | 2/2010 | Weise | G06F 3/0482 |
| | | | | 715/853 |
| 2011/0078603 | A1 * | 3/2011 | Koomullil | G06F 17/30386 |
| | | | | 715/769 |

OTHER PUBLICATIONS

U.S. Appl. No. 13/200,139, filed Sep. 19, 2011, Zhang, et al.
U.S. Appl. No. 13/800,044, filed Mar. 13, 2013, Joyce, et al.
U.S. Appl. No. 14/031,210, filed Sep. 19, 2013, Joyce, et al.

* cited by examiner

*Primary Examiner* — Andrew Tank
(74) *Attorney, Agent, or Firm* — Muirhead and Saturnelli, LLC

(57) ABSTRACT

Techniques for event processing include receiving notification at a navigation service of a first event regarding an interaction with a user interface element of a user interface of an application. The notification includes parameter(s) a navigation point in the application. Responsive to receiving the notification, first processing is performed by the navigation service, including identifying first target code invoked for updating the user interface to include a content view associated with the navigation point, identifying alternative views associated with the navigation point and a first alternative view as a default view, and transferring control to the first target code to update the user interface whereby additional information indicating the first alternative view and the alternative views is provided to the first target code to displays data for the navigation point in accordance with the first alternative view.

17 Claims, 11 Drawing Sheets

ALTERNATIVE VIEW-BASED NAVIGATION

BACKGROUND

Technical Field

This application generally relates to user interfaces.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a data storage system including a plurality of host interface units, disk drives, and disk interface units. The host systems access the data storage system through a plurality of channels provided therewith. Host systems provide data and access control information through the channels and the storage system provides data to the host systems also through the channels. The host systems do not address the disk drives of the storage system directly, but rather, access what appears to the host systems as a plurality of logical disk units. The logical disk units may or may not correspond to the actual disk drives. Allowing multiple host systems to access the single data storage system allows the host systems to share data stored in the storage system. In order to facilitate sharing of the data on the data storage system, additional software on the data storage systems may also be used.

In connection with an application for management of data storage systems, or more generally any application, a user interface may be displayed. Existing applications providing a user interface may control various aspects of user interface (UI) elements, such as visual aspects of buttons, displayed text, and the like, by setting properties of the user interface elements within the application code.

SUMMARY OF THE INVENTION

In accordance with one aspect of the invention is a method of event processing comprising: receiving notification at a navigation service of a first event regarding an interaction with a user interface element of a user interface of an application, the notification including a set of one or more parameters describing context information about the notification, the set of one or more parameters including information identifying a navigation point in the application; and responsive to receiving the notification, performing first processing by the navigation service, the first processing including: identifying first target code of the application to be invoked for updating the user interface to include a content view associated with the navigation point; identifying a plurality of alternative views associated with the navigation point and a first of the plurality of alternative views as a default view for the navigation point, each of the plurality of alternative views identifying a different way in which data of the content view for the navigation point is displayed in the user interface; and transferring control to the first target code to update the user interface whereby additional information indicating the first alternative view and the plurality of alternative views are provided as inputs to the first target code, wherein the first target code displays data for the navigation point in accordance with the first alternative view. A navigational structure file may be provided as an input to the navigation service. The navigational structure file may include a description of a hierarchical structure describing the navigational flow of the application. The hierarchical structure may include objects corresponding to different navigation points of the application whereby interaction with a user interface element causes transition or navigation from a first navigation point of the application to a second navigation point of the application as described in the hierarchical structure. Each navigation point of the application may be represented by a node in the hierarchical structure, each navigation point being associated with a content view. The hierarchical structure may form a tree structure of a plurality of nodes corresponding to a plurality of navigation points of the application. The tree structure may include a plurality of levels. Each of said plurality of levels may include one or more nodes. The tree structure may include a root node at first level and one or more nodes at one or more other levels, and one or more leaf nodes. A first content view may be associated with a first node that is not a leaf node and may represent a first navigation point of the hierarchical structure. The first content view may include a first user interface element which, when selected, results in navigation to a second content view associated with a second node representing a second navigation point of the hierarchical structure. The first node may be a parent node of the second node, and the second node may be a child node of the first node. The hierarchical structure of the navigational structure file may include a first node representing the navigation point and the content view. The navigational structure file may include information for the first node whereby the information for the first node includes data identifying the first target code of the application, identifying the plurality of alternative views, and identifying the first alternative view of the plurality of alternative views as a default view for displaying information in the user interface when navigating to the navigation point. A first user of the application may interact with the user interface element thereby causing the first event, and the method may further comprise displaying information for the navigation point to the first user in the user interface in accordance with the first alternative view; and displaying a first set of one or more user interface elements indicating other alternative views of the plurality of alternative views besides the first alternative view. The method may also include selecting, by the first user, one of the user interface elements of the first set thereby indicating a second of the plurality of alternative views; and responsive to selecting the one user interface elements indicating the second alternative view, storing information indicating the second alternative view as a user preference for the navigation point for the first user in a first set of user preferences including customizations of the user interface for the first user. If the first user does not perform the selecting to select one of the user interface elements of the first set, and where if data for the navigation point is also currently displayed in accordance with the first alternative view that is the default alternative view, then the first alternative view that is the default alternative view may be stored as the user preference for the navigation point. The first event may be caused by the first user navigating to the navigation point at a first point in time. The first user may subsequently navigate again to the navigation point at a second point in time thereby causing a second event, and the method may further comprise receiving a second notification of the second event, the second notification including a second set of one or more parameters describing context information about the second notification, the second set of one or more parameters including information identifying the navigation point in the application; and responsive to the second event occurrence, displaying information associated with the navigation point in accordance with the first set of user preferences for the first user thereby causing information associated with the navigation point to be displayed on the user interface in accordance with the second alternative view. The first target code may perform a call to a server to request first data associated with the navigation point. The first data may then be displayed to the first user in accordance with the first alternative view as part of displaying information for the navigation point to the first user.

In accordance with another aspect of the invention is a method for providing alternative view-based navigation of an application, the method comprising: receiving a navigational structure file including a description of a hierarchical structure for a navigational flow of the application, the hierarchical structure including nodes corresponding to different navigation points of the application whereby interaction with a user interface element causes transition or navigation from a first navigation point of the application to a second navigation point of the application as described in the hierarchical structure, wherein the navigational structure file includes first information for a first node of the hierarchical structure whereby the first node represents the first navigation point in the application, the first information identifying a plurality of alternative views of data displayed in connection with the first navigation point and the first information indicating a first of the plurality of alternative views as a default view for displaying data in connection with the first navigation point; receiving notification of a first event regarding an interaction with a user interface element of the user interface whereby the first event is a request to navigate to the first navigation point; and responsive to receiving the notification, performing first processing to display information for the first navigation point of the application in a user interface, the first processing including: retrieving, from the navigational structure file, the first information; and displaying data associated with the first navigation point in accordance with the default view of the first information. The method may also include displaying a set of one or more user interface elements, each user interface element in the set representing one of the plurality of alternative views besides the default view; selecting, from the user interface by a first user, a first user interface element from the set displayed, the first user interface element representing a second of the plurality of alternative views; and storing a first user preference for the first user whereby the first user preference indicates the second alternative view as a customized user configurable view used when subsequently displaying data associated with the first navigation point for the first user. The plurality of alternative views for displaying data in connection with the first navigation point may include any of a table, an icon, an image, a graph, a chart, a detailed view of information associated with the first navigation point, a summary view of information associated with the first navigation point, and a selection of data in accordance with a skill level or role. A bookmark denoting the first navigation point may be specified for the first user whereby, when the first user initially starts the application in a subsequent second session, the bookmark denoting the first navigation point of the application may be loaded as a current starting location within the application and data for the first navigation point may be displayed in accordance with the second alternative view stored in the first user preference for the first user.

In accordance with another aspect of the invention is a computer readable medium comprising code stored thereon for providing alternative view-based navigation of an application, the computer readable medium comprising code stored thereon for: receiving a navigational structure file including a description of a hierarchical structure for a navigational flow of the application, the hierarchical structure including nodes corresponding to different navigation points of the application whereby interaction with a user interface element causes transition or navigation from a first navigation point of the application to a second navigation point of the application as described in the hierarchical structure, wherein the navigational structure file includes first information for a first node of the hierarchical structure whereby the first node represents the first navigation point in the application, the first information identifying a plurality of alternative views of data displayed in connection with the first navigation point and the first information indicating a first of the plurality of alternative views as a default view for displaying data in connection with the first navigation point; receiving notification of a first event regarding an interaction with a user interface element of the user interface whereby the first event is a request to navigate to the first navigation point; and responsive to receiving the notification, performing first processing to display information for the first navigation point of the application in a user interface, the first processing including: retrieving, from the navigational structure file, the first information; and displaying data associated with the first navigation point in accordance with the default view of the first information. The computer readable medium may further include code for displaying a set of one or more user interface elements, each user interface element in the set representing one of the plurality of alternative views besides the default view; selecting, from the user interface by a first user, a first user interface element from the set displayed, the first user interface element representing a second of the plurality of alternative views; and storing a first user preference for the first user whereby the first user preference indicates the second alternative view as a customized user configurable view used when subsequently displaying data associated with the first navigation point for the first user. The plurality of alternative views for displaying data in connection with the first navigation point may include any of a table, an icon, an image, a graph, a chart, a detailed view of information associated with the first navigation point, a summary view of information associated with the first navigation point, and a selection of data in accordance with a skill level or role. A bookmark denoting the first navigation point may be specified for the first user whereby, when the first user initially starts the application in a subsequent second session, the bookmark denoting the first navigation point of the application may be loaded as a current starting location within the application and data for the first navigation point may be displayed in accordance with the second alternative view stored in the first user preference for the first user.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
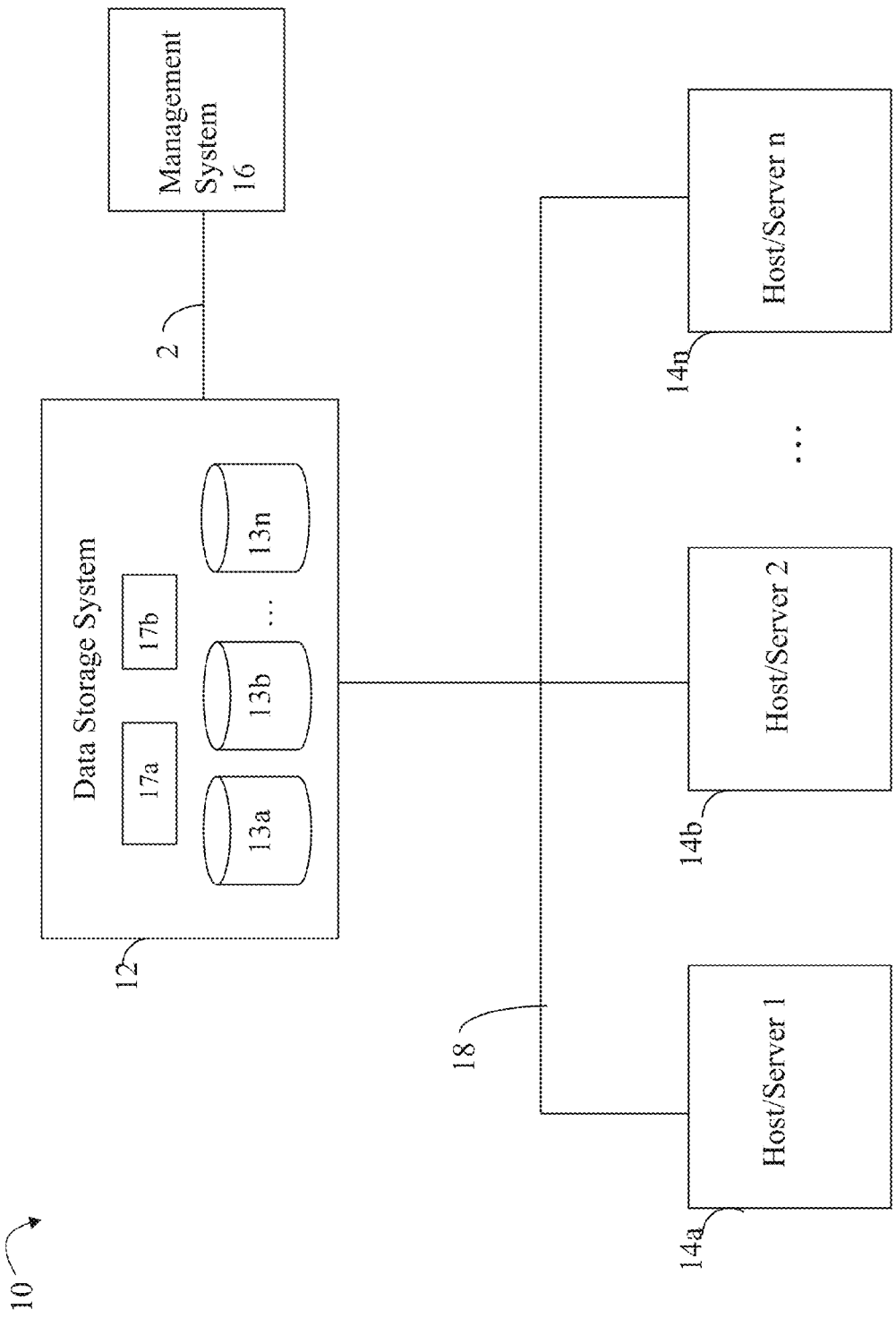
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a VNX™ data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The VNX™ data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
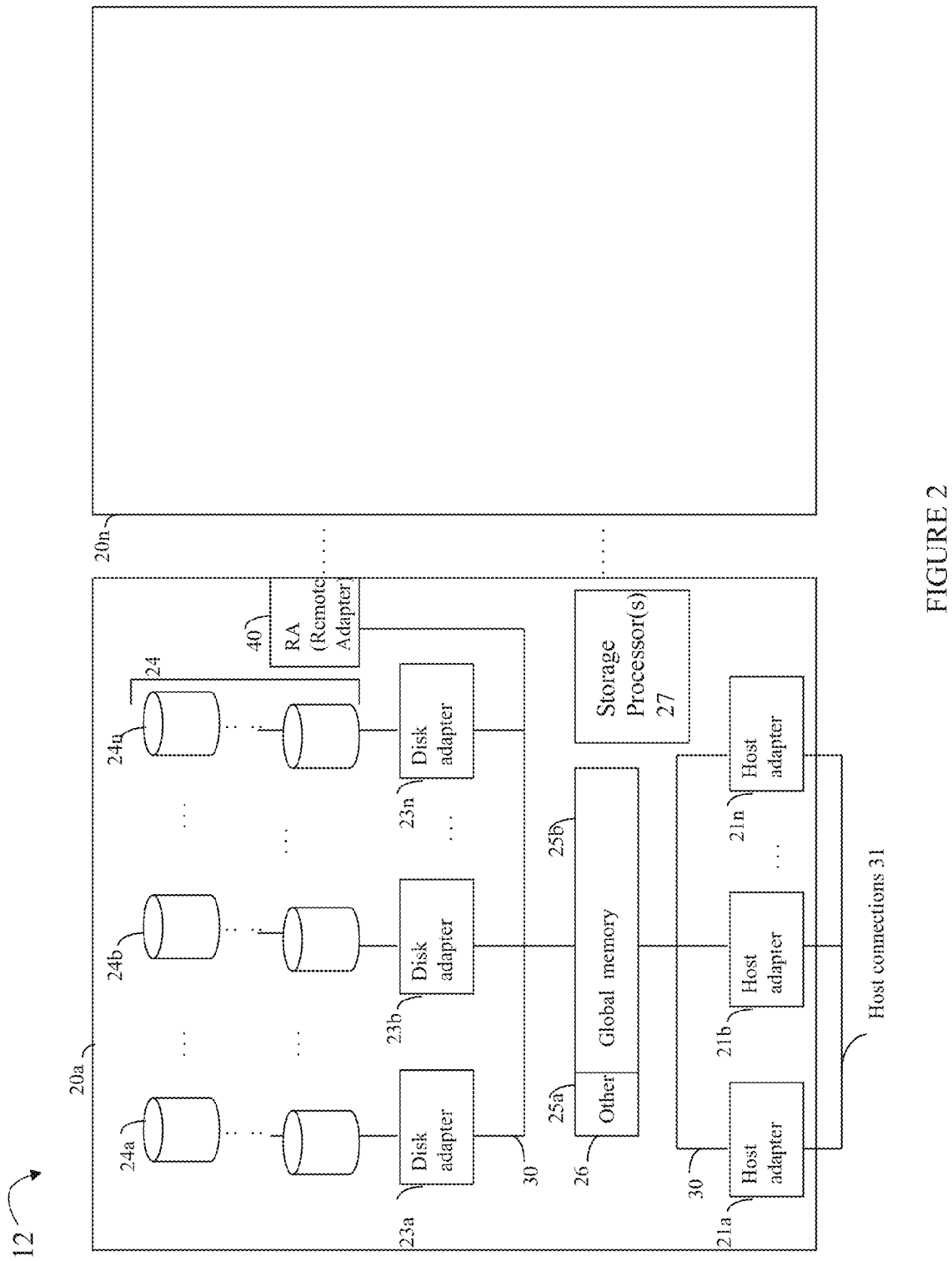
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

A configuration of a data storage system may be described by data storage configuration information. The data storage configuration information may describe various entities, attributes, and the like, about how the physical storage systems and devices are configured such as by a manager or system administrator. For example, the data storage configuration information may identify and describe LUNs, file systems, RAID groups, and the like, as may be formed using the physical data storage of the data storage system. With reference back to FIG. 1 in one embodiment, management software may be executing on the management system 16 where the user may be issuing requests in connection with reading and/or writing data storage configuration information that may be stored on physical storage device of the data storage system 12. More generally, the management system 16 may be referred to as a client issuing requests to the data storage system 12 which acts as a server to service the client requests (e.g., read and write requests) for data storage configuration information.

In general, a storage area network (SAN) may be characterized as a collection of data storage systems that are networked together via a switching fabric to a number of host computer systems operating as servers such as illustrated in FIG. 1.

Data storage management applications may include a graphical user interface (GUI) that enables a network manager to graphically manage, control, and configure various types of hardware and software resources associated with a corresponding managed storage area network and its data storage systems. The management application may execute, for example, on the management system 16 of FIG. 1. The management application may generate a graphical user interface utilized by a storage administrator to graphically select, interact with, and manage local or remote devices and software processes associated with the storage area network. Based on use of the graphical user interface in combination with an input device (e.g., tablet pen or stylus, hand operated mouse) and corresponding pointer displayed on a viewing screen or other display, a storage administrator is able to manage hardware and software entities such as file systems, databases, storage devices, volumes, peripherals, network data communications devices, etc., associated with the storage area network. Consequently, the storage management system 16 and associated management software enables a storage administrator (a person responsible for managing the storage network) to manage the storage area network and its resources.

One example of this kind of GUI includes a screen presentation that may include toolbars with accompanying menus and menu items as well as displays such as graphs, tables, maps or trees. The management application providing the GUI may be written in any suitable language such as JavaScript, Flex, and the like.

Described in following paragraphs are techniques that may be used in connection with web based GUI frameworks, such as may be included in the GUI of a data storage management application, which may use generic navigation code, such as of a navigation service. The navigation code may control the overall flow of the application (such as via UI navigation) and may support deep linking so that the user can make use of browser functionality such as the browser back/forward button and bookmark pages in context. In connection with the navigation service, techniques are described in following paragraphs that allow a payload (such as data in the form of one or more parameters) to be passed at each level within the deep linking since some working pages need additional context to function. Techniques herein may be used to reduce coupling of the working page (e.g., such as displayed by a web browser using code of an application's UI) and the navigation service (e.g., which may be characterized as generic and used in connection with multiple different applications and their UIs) so that the working page may be unaware of the navigation service. Techniques described in following paragraphs provide for automatically injecting the payload during page creation instead of the page pulling content from the navigation service. Additionally, techniques herein may provide for use of identifying one or more alternative views for displaying data included in a particular page. Furthermore, a particular one of multiple configurable views may be selected as a default view for displaying data of a particular page or navigation point in an application. Additionally, a user may configure or customize data display for a navigation point having multiple possible alternative views for displaying data by selecting or specifying a particular one of the available alternative views specific to a particular page or navigation point. The optional multiple alternative views, as well as a default view, for a particular navigation point may be specified using metadata included an external navigation configuration file.

In connection with the above-mentioned techniques and embodiments thereof, a web browser or browser, such as Internet Explorer™ by Microsoft Corporation, Firefox, and the like, may be used to retrieve, process, and present resources. The resources may be web pages such as HTML (hyper text markup language) documents, as well images, videos, as other content. A resource that is a web page may be written in a language such as HTML whereby HTML may be characterized as a tag-based language. The browser does not display the HTML tags but rather uses the tags to interpret the contents of the page. The browser reads and interprets the HTML documents and composes or renders them into visible or audible web pages. In other words, the browser does not display the HTML tags, but uses the tags to interpret the content of the page. An HTML document may reference various resources which may be retrieved in connection with rendering the document for display as a webpage. The resources retrieved in connection with rendering the webpage may be identified using URLs (uniform resource locators) referenced within the HTML document. Thus, a first HTML document may reference or provide a link to a second HTML document, or more generally any second resource. For example, the HTML document may include appropriate HTML tags, such as the <a>tag (e.g., <a href="http://www.hyperlinkcode.com">Hyperlink Code</a>), specifying a hyperlink to another second HTML document. The second HTML document may be retrieved and loaded into the web browser upon selection of the hyperlink.

Hyperlinks allowing for connection between different web pages if a particular hyperlink is selected may be characterized as the navigational flow of an application. This is described in more detail elsewhere herein.

A web browser may be used in connection with requesting one or more resources, such as documents including various types of content for processing and/or display by the web browser. Generally, the web browser or browser may be characterized as a software application for retrieving, presenting, interpreting, traversing and/or processing information resources such as may be obtained from one or more internet locations or websites (e.g., servers or hosts have an IP address). A web page processed by the web browser may be a document or file, or more generally a resource, such as an HTML (hyper text markup language) file written in accordance with the HTML language that may include tags. The resource identified by a URL may be an HTML file or document, an image, a video, a multi-media file, an application (e.g., a resource including executable code or instructions), a script (e.g., containing instructions), or more generally, any allowable information or content that may be processed for use with the web browser in connection with rendering a web page. Each URL included in an HTML file may denote a resource which the web browser automatically requests from the identified location in the URL when processing the HTML file for display as a webpage in a window. As also known in the art, an HTML file such as processed by the browser may also include instructions in the form of a scripting language, such as JavaScript™.

A deep link may be characterized as a hypertext link to a resource or page on a website other than its homepage. The use of "deep" in this context of deep linking generally refers to the depth of the page in a site's hierarchical structure of pages. Any page, or more generally, content identified using a URL to identify the content location below the top page in the hierarchy (e.g., the home page) can thus be considered deep. For example, "www.xyz.home" may refer to a top level page or URL in a hierarchy and "www.xyz.home.level1" may be characterized as a deep link referring to a page or resource at a site at other than the top level.

To render a document such as an HTML page, most web browsers use an internal object model such as a document object model (DOM) (e.g., such as the DOM by W3C the World Wide Web Consortium). With DOM, the nodes of every document are organized in a tree structure, also referred to as the DOM tree, with the topmost node named "Document object". When an HTML page is rendered in a browser, the browser downloads the HTML into local memory and automatically parses it to display the page on a screen. The DOM is also a way in which JavaScript may transmit the state of the browser in HTML pages. A web browser may rely on a layout engine to parse input files, such as HTML and other input files, into a DOM. The DOM may be defined as a platform and language-neutral interface that allows programs and scripts to dynamically access and update the content, structure, and style of a document. The DOM may be characterized as an object model defining a logical structure of documents and the way a document is accessed and manipulated. The term "document" may be used to more generally represent many different kinds of information or data. XML and HTML, for example, present this data as documents, and the DOM may be used to manage this data. With the DOM, programmers can build documents, navigate their structure, and add, modify, or delete elements and content. For example, any object created as a result of executing statements of an HTML or XML document can be accessed, changed, deleted, or added using the DOM.

With the DOM, documents are modeled using objects, and the model encompasses the structure of a document and also the behavior of a document and the objects of which it is composed. As an object model, the DOM may be characterized as identifying the interfaces and objects used to represent and manipulate a document, the semantics of these interfaces and objects—including both behavior and attributes, and the relationships and collaborations among these interfaces and objects. For example, an input file such as an HTML file, processed by a browser may include a definition for a table having a particular structure, content and attributes. The DOM may be used to represent the content (e.g., data of table elements), structure (e.g., number of rows, columns) and style (e.g., attributes of displayed text as bold, font size, location of the table in a defined area of a display) of objects in the document such as the table. An embodiment may use a language, such as XML or HTML, to describe the objects corresponding to information rendered in a display by the browser.

Websites which are built on web technologies such as Adobe Flash and AJAX (Asynchronous JavaScript and XML) may not support deep linking. This can result in usability problems for people visiting such websites. For example, visitors to these websites may be unable to save bookmarks to individual pages of the site, web browser forward and back buttons may not work as expected, and use of the browser's refresh button may return the user to the initial page. AJAX may be characterized as a group of interrelated web development (e.g., JavaScript and XML or JavaScript and JSON (JavaScript Object Notation)) technologies used on the client-side to create both synchronous and asynchronous web applications. With AJAX, web applications may, for example, can send data to, and retrieve data from, a server asynchronously (e.g., in the background) without interfering with the display and behavior of the existing page. Data may be retrieved, for example, by issuing HTTP requests. With AJAX, for example, HTML and CSS (Cascading Style Sheets, described elsewhere in more detail) may be used in combination to mark up and style information. Also, the DOM may be accessed with JavaScript to dynamically display, and to allow the user to interact with the information presented. JavaScript and the use of HTTP requests for specified data may be used for exchanging data asynchronously between browser and server to avoid full page reloads. JSON is a text-based open standard designed for human readable data interchange based on the JavaScript scripting language for representing objects. As noted above, JSON may be used an alternative to XML.

Dynamic HTML (DHTML) may be characterized as a term referring to a collection of technologies used together to create interactive and animated websites using a combination of a static markup language (such as HTML), a client-side scripting language (such as JavaScript), a presentation definition language (such as CSS or cascading style sheets), and the DOM. DHTML allows scripting languages to change variables in a web page's definition language, which in turn affects the look and function of otherwise "static" HTML page content, after the page has been fully loaded and during the viewing process. Thus the dynamic characteristic of DHTML is the way it functions while a page is viewed, not in its ability to generate a unique page with each page load. DHTML allows for use of a scripting language, for example, to change the DOM, to change associated style, and/or to change displayed content. As noted above, DHTML may be characterized collectively as a product of related and complementary technologies such as, for example, HTML, Cascading Style Sheets (CSS), and Javascript. To allow scripts and components to access features of HTML and CSS, the contents of the document may be represented as objects in a programming model such as the DOM.

The DOM may include an API (application programming interface) providing a structured interface that allows access and manipulation of virtually anything in the document. The HTML elements in the document are available as a hierarchical tree of individual objects, meaning you can examine and modify an element and its attributes by reading and setting properties and by calling methods. The text between elements is also available through DOM properties and methods. The DOM also provides access to user actions such as, for example, pressing a key and clicking the mouse. Such actions may be examples of events that may be intercepted and processed by registered event handler functions and routines. The event handler receives control each time a given event occurs and can carry out any appropriate action, including using the DOM to change the document.

Styles may be generally characterized as attributes of different elements that may be described in an HTML file whereby styles relate to how to display or affect visual aspects of such elements. For example, styles relate to font, color, whether to bold, and the like. CSS refers to external style sheets where style information (e.g. formatting and appearance) may be specified in files separate from HTML files using such style information. Dynamic styles, such as using CSS, may provide for modifying the appearance and formatting of elements in a document without adding or removing elements. The DOM may also provide programmatic access to styles. This means a programmer may change inline styles on individual elements and change style rules using script-based programming. These scripts can be written in any language supported by the target browser, such as JavaScript, Microsoft JScript, or Microsoft Visual Basic Scripting Edition (VBScript). Inline styles are CSS style assignments that have been applied to an element using the style attribute. A programmer may examine and set these inline styles by retrieving the style object for an individual element. For example, to highlight the text in a heading when the user moves the mouse pointer over it, the style object may be used to enlarge the font and change the color of displayed text.

Data binding is a DHTML feature for binding individual elements in a document to data from another source, such as a database or comma-delimited text file. When the document is loaded, the data is automatically retrieved from the source and formatted and displayed within the element. For example, data binding may be used to automatically and dynamically generate tables in a document such as by binding a table element to a data source. When the document is viewed, a new row is created in the table for each record retrieved from the source, and the cells of each row may be filled with text and data from the fields of the record. Because this generation is dynamic, the user can view the page while new rows are created in the table. Additionally, once all the table data is present, scripting code in the document may be used, for example, to manipulate (e.g., sort or filter) the table data without requiring the server to send additional data. The table may be regenerated using the previously retrieved data to fill the new rows and cells of the table. As another example, data binding with DHTML may be used to bind one or more elements in the document to specific fields of a given record or form. When the page is viewed, the elements are filled with text and data from the fields in that record, sometimes called the "current" record. The user of the UI may view the content also change that content by changing the settings and values of the form. The user can then submit these changes so that the new data is uploaded, for example, to a server.

In accordance with techniques herein, an embodiment may provide for dynamically updating the contents of a web page making calls as needed to the server to obtain such contents without reloading, changing, and/or refreshing the current web page. An embodiment may use a navigation services described in more detail below and may use DHTML techniques and technologies to perform the foregoing dynamic updating of different aspects of the current web page. For example, the DOM of the current page may be modified and the content of the page may be modified. As needed, content may be retrieved from the server. Additionally, an embodiment in accordance with techniques herein may use metadata to optionally specify alternative views and a default view for displaying information for particular navigation points of the application. Furthermore, an embodiment may allow for user preferences and user configurable data displays to customize how data at different navigation points is displayed for a user. User preferences for a user may indicate one of the available alternative views as the one to use when displaying data for that particular user on a per navigation point basis or level of granularity.

Figure 3:
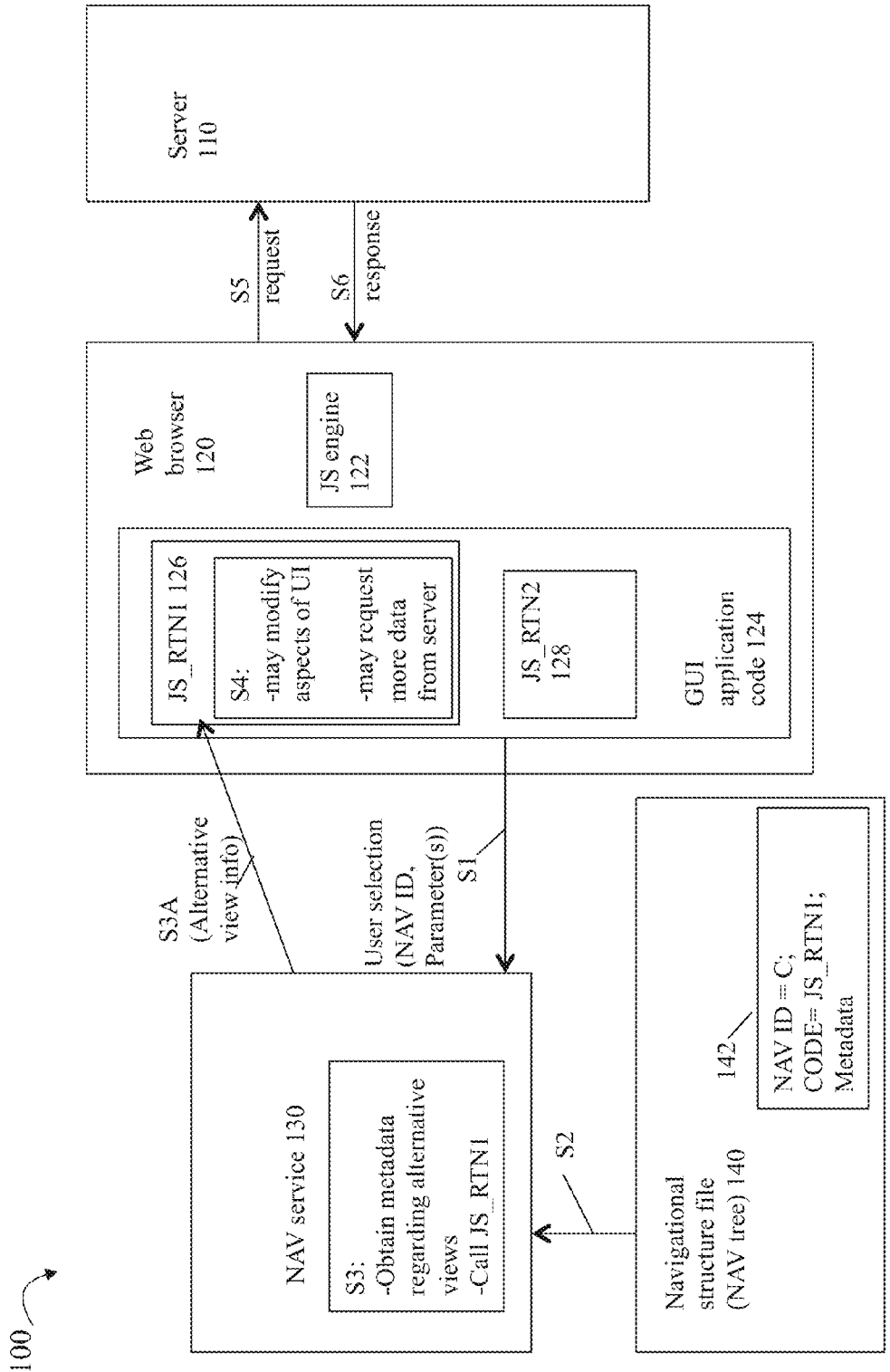
FIG. 3 is an example illustrating components and associated data flow that may be performed in an embodiment in accordance with techniques herein.

Referring to FIG. 3, shown is an example 100 of components that may be included in a system for use with techniques herein. The example 100 includes a navigational (NAV) service 130, a navigational structure file 140, a web browser 120 and a server 110. In one embodiment, the components 120, 130 and 140 may all reside in a single computer system, such as the management system 16 of FIG. 1. The components 120, 130 and 140 may be included in a client application, such as the data storage management application. More specifically, the management application may include GUI application code 124 which is executed by a web browser. For example, the GUI application code 124 may include JavaScript code which runs in the browser 120. The browser 120 may include a JavaScript (JS) engine 122 which performs processing to parse, interpret and execute the GUI application code 124. The management application including GUI application code 124 may have a navigational structure or application flow as described in the NAV structure file 140 which will be described in more detail below. The management application including GUI application code 124 for providing the application's GUI through the browser 124 may use the NAV service 130 and the NAV structure file 140 to provide for navigation control flow through the management application thereby responding to events generated due to user selections and interactions with the GUI displayed in the browser 120. The NAV service 130 may be characterized as a generic service or generic navigation code that may be utilized by the GUI of the management application, as well as more generally any application having its navigational structure and flow described in 140, to provide for navigation control flow through the application thereby responding to events generated due to user selections and interactions with the GUI displayed in the browser 120. In following paragraphs reference may be made to the particular data storage management application and its GUI code 124 (also referred to as a client) being used to manage a server 110 that represents one or more data storage systems. However, the techniques described herein using the NAV service 130 and GUI code of the application may be used, more generally, in connection with any application functioning as a client and any server.

The GUI application code 124 may include multiple code modules or components (e.g., different dialogues, wizards, and the like) of the UI written by different developers such as to support different GUI features. For example, as described in more detail below, the application's UI may be partitioned at a high level into multiple navigational sections whereby each such section may include a portion of the overall navigational flow of the GUI. Within each navigational section, a user may interact with the GUI causing traversal or navigation between different navigation points each causing display of different content, UI elements, and the like, also referred to herein as a content view. Thus, the selection or interaction of a user with a UI element may function as a navigational link between different navigation points each having different associated content views displayed in response to UI navigation to each particular navigation point. The application's entire navigational structure may be described in the NAV structure file 140 which may link together the various UI navigational flows or paths that may be taken by a user interacting with the application's GUI. For example, a user may make a series of menu selections, select particular links, and other UI interactions each resulting in display of different content views. The NAV structure file 140 may thus be characterized as describing the application's UI navigational flow that may include multiple components of the UI. In this manner, the NAV structure file 140 may tie together the overall application GUI navigational flow with the individually developed navigational sections (and portions thereof) including different code portions used to generate different content views whereby each such code portion may be navigationally unaware of other content views and/or the overall navigational flow described by NAV structure file 140.

Although following paragraphs may provide exemplary uses of techniques herein with data storage management, it will be appreciated by those skilled in the art that techniques herein have broader use and applicability, more generally, with any type of UI having associated content views displayed. For example, techniques herein may be generally used with any application having a UI with a workflow reflected in connection with a series UI elements (e.g., such as menus, tabs, buttons, data input fields, and the like), the different user responses and selections, and the resulting UI content views displayed in response to such various user inputs and selections from such UI elements. The foregoing may be represented in a hierarchal manner of different UI content views displayed in response to user inputs and/or selections for displayed UI elements.

A content view may be characterized as what data or content is displayed and how such data is represented in connection with a UI at a point in time. The data or content may include, for example, a list of detailed information about a single host or single LUN. Depending on the particular detailed information, the list of detailed information may be displayed on the UI in any one of a variety of different UI elements or structures such as a table, chart, graph, menu list, and the like. Further a particular UI element, such as a menu or selection button may further be represented in different ways based on other attributes. For example, a menu may be a drop down menu, or the menu items may rather be displayed as a set of tabs. A table may have different display options related to spacing, sizes, borders, whether text is bolded or in a particular font, and the like. A displayed UI element in a first content view, when selected, may also provide a link to another second UI content view. Collectively, such information regarding the data or content and how to display or visually represent the content on a UI display may be referred to as a content view. Each different UI displayed, such as in response to a menu selection, may be characterized as having its own UI content view. As such, the series of UI displays in response to selecting a sequence of one or more UI elements (e.g., in response to a selection, button selection, and the like) may be represented as a work flow, navigational flow, or path originating from the first UI display. Each node in the path corresponds to a UI display or a UI content view. The possible paths, where each node in a path has a corresponding UI content view, may be represented in a hierarchical structure such as a tree. The NAV structure file 140 may describe the foregoing hierarchical structure or tree of the UI navigational flow. A user may navigate from a source UI content view to a target UI content view by selecting or otherwise interacting with one of the UI elements that may be included in the source UI content view. In this manner, the foregoing one UI element may serve as a navigational UI link to the target content view.

The application's navigational structure may be specified in the NAV structure file 140 and provided as an input to the NAV service 130 during runtime when executing the application and its GUI code 124. During runtime of the application at its GUI code 124, a user may make a selection or otherwise interact with a UI element of the GUI causing generation of a navigation event. The UI element may be displayed in a current content view whereby selection or user interaction with the UI element may denote a UI navigation to a target content view. It should be noted that the target content view and associated target navigation point may be different from a current content view and current navigation point in the application, such as, for example, when a user navigates to a different page or location of the application. Alternatively, the target content view and target navigation point may be the same, respectively, as the current content view and current navigation point of the application such as, for example, where the user enters data or makes a selection within a currently displayed page that does not result in navigation to a new location or navigation point in the application.

The NAV service may be registered to receive notification of such UI events. In a step S1, the web browser may therefore notify the NAV service regarding the occurrence of a navigational, or more generally, a particular UI event. The web browser may also include context information in the notification of S1, such as any particular UI element selected within a current display and any associated data. The particular UI element selected may be mapped by the NAV service 130 to a particular navigation point or node in the NAV structure file thereby denoting that selection or interaction with that particular UI element denotes a navigational transition to a target navigation point of the NAV structure file 140. The context information in S1 passed from the browser 120 to the NAV service 130 may therefore include a navigational identifier (NAV ID) denoting the foregoing UI element causing navigation or transitioning from a current navigation point to a new location, the target navigational point, denoted by NAV ID. Thus, the NAV ID may be associated with a target content view. Additionally, the context information may include one or more parameters (params). The params may include, for example, information identifying a menu item selected, an input value such as input through a dialogue or field in a form, a particular item (e.g., row, column, entry) of a selected table item, and the like.

It may also be the case where the UI event does not cause navigation to a new location (e.g., the source or current navigation point in the application is the same as the target navigation point denoted by NAV ID) and the parameters may indicate a UI selection or data input by the user. For example, the parameters may identify a user selection of a particular one of multiple possible alternative views which the user may have selected for displaying data associated with the target navigation point denoted by the NAV ID. Examples of possible alternative views may include a graph, table, icon, and the like. This is described in more detail elsewhere herein.

In a step S2, the NAV service 130 may obtain information from the NAV structure file 140 associated with the target navigation point denoted by NAV ID received in the context information of S1. In particular, the information obtained from the NAV structure file 140 may identify a target body of code (e.g., routine, function, method and the like) within the GUI application code 124 invoked to further process the UI navigational event associated with the transition or navigation from the current navigation point to a target navigation point denoted by NAV ID. The information obtained from the NAV structure file 140 for the target navigation point NAV ID may also optionally include metadata describing alternative available views and a default view for displaying data in the UI associated with the particular NAV ID. Information regarding the metadata (e.g., alternative available views and default view) obtained from the NAV file 140 may be provided to the target body of code for use in displaying information associated with the target navigation point.

With reference to FIG. 3, element 142 may represent the information obtained from the NAV structure file 140 when the target navigation point has a NAV ID of C. The file 140 may further identify that the target body of code in the GUI application code 124 is JS_RTN1 (denoted by element 126) and metadata may alternative view information including the possible alternative views available for the target navigation point and a default view.

In a step S3, the NAV service 130 may obtain the foregoing information from the NAV structure file 140, perform any other necessary processing, and then transfer control in step S3A to the target body of code JS_RTN1 126 in the GUI application code 124. In connection with the transfer of control in S3A, alternative view information may be provided to the JS_RTN1 126. The target body of code JS_RTN1 126 may perform processing in step S4 including modifying aspects of the UI. Such modification may include, for example, dynamically modifying the DOM (e.g., create new layouts or structures such as a new table, modify an existing structure, create new UI elements, and the like). Such processing in step S4 for modifying aspects of the UI may include, for example, modifying styles or attributes affecting visual display of currently displayed elements. Such processing in step S4 for modifying aspects of the UI may include, for example, requesting additional data S5 which is then returned S6 from the server 110. Some or all of the returned data may then be included as content displayed in the UI for the target navigation point. Some or all of the returned data may be further processed (e.g., by the target body of code JS_RTN1 126 or other code of the GUI application code 124) so that resulting or derived data generated as an output of the processing may be included as content displayed in the UI for the target navigation point having a target content view.

The JS_RTN1 126 may further use the alternative view information provided in connection with displaying data for the selected target navigation point. The alternative view information provided may denote a default view whereby data of the target navigation point may be displayed in accordance with the default view. The alternative view information may also identify the multiple possible alternative views associated with the selected target navigation point. For example, the default view may be to display data in a table. However, other possible alternative views may include a graph. In this manner, the information provided to JS_RTN1 126 in step S3A may identify the multiple alternative available views of table and graph, and may also identify a default view of table. At a first point in time in response to a first UI event, information may be displayed to the user in the form of the default view as a table. Additionally, the UI at the first point in time may include a panel of buttons or other UI elements denoting the other possible alternative view of a graph. Subsequently, at a second point in time in connection with a second UI event where the user selects the UI element associated with the alternative graph view, the user may then modify the view used for displaying information of the target navigation point. In an embodiment, such information regarding the selected alternative view for the target navigation point may be persisted for the particular user whereby the selected alternative view of graph may be used to render information to the particular user when the user subsequently navigates again to the same target navigation point. The foregoing as well as other details are more fully described elsewhere herein.

To further illustrate the processing just described such as in connection with the first point in time mentioned above, a user may make a UI selection (e.g., such as by selecting a button, tab or menu item) to view a table of information, such as a list of physical or logical entities of the data storage system (server 110). The table of such entities may be, for example, physical storage devices, logical devices or hosts. The NAV service 130 may be notified regarding the UI selection in step S1 denoting a transition or navigation from a current navigation point to a target navigation point. The target navigation point may be identified by NAV ID and have a content view including the table of information (where table is the default view). Using the NAV ID, the NAV service 130 may obtain information represented by 142 from the NAV structure file 140 and perform step S3 and then transfer control S3A to target body of code JS_RTN1 126. The target body of code may perform processing to request S5 from the server 110 information regarding the entities for inclusion in the table. The server 110 may return the requested information in a response S6 to the web browser for use by the target body of code (JS_RTN1 126) of the GUI application code 124. The code 126 may then perform processing to modify the DOM such as to create a new table and populate the new table with the information returned in the response of S6. The new table may then be included in the content displayed on the GUI for the target navigation point. In this manner, NAV service facilitates UI navigation by invoking a target body of code in the GUI application code 124 and using techniques herein for providing alternative view information for use by the target body of code. In this example, the table view may be used to display the information for the current navigation point Additionally, as noted above, the UI displayed at the first point in time may include a UI element for the possible alternative view of a graph. At this first point in time, a user preference view of table may be identified and stored for the user for the current navigation point.

At the second point in time, the user may select the foregoing UI element denoting the graph alternative view thereby indicating that the user prefers to view information displayed for the target navigation point as a graph rather than a table. In a manner similar to that as described above, the user's selection may result in a second UI event communicated to the NAV service 130 whereby such notification identifies the user selection of the graph alternative view and indicates that the new target navigation point has the same NAV ID as the current navigation point. Information regarding the selected graph alternative view associated with the NAV ID may be passed communicated in S1 to the NAV service 130 which then performs processing as described above in connection with FIG. 3 for the first event notification at the first point in time. In one embodiment, the user preferences may be persisted or stored by the NAV service 130. In this case, the NAV service may store the user preference of graph view. Additionally, the NAV service in S3A may communicate the user preference of graph view for the NAV ID as the default view to be used for the current user and display, along with the other available alternative views. Thus, the default view communicated in S3A may represent the current view to be used for display for the current user and the current navigation point. In a different embodiment, the user preferences may be persisted or stored by the GUI code 124. In this case, the NAV service may communicate in S3A alternative view information as represented in the NAV file 140 (e.g., identifying all available alternative views and the default view as specified in 140 for the NAV ID) and may also additionally communicate the user selected specified view preference of graph. The invoked routine 126 or other code of the GUI application 124 may then store any user preferences denoting the user-preferred view for the navigation point.

Additionally, an embodiment may perform a variation to the foregoing when the current and target navigation points are the same and the user preferences are stored and maintained by the GUI application code 124. In such a case, control may be passed to the GUI application code 124 for processing rather than notify the NAV service 130 upon the occurrence of the second event as noted above. In this case, the GUI application code 124 may simply update the displayed UI to include the data for the target navigation point in the newly selected form of a graph, rather than a table. Additionally, information regarding the newly selected user view preference of graph may be stored by the GUI application code 124 in the user preferences for the particular user and associated navigation point.

In connection with the processing performed in S4 by the target body of code, such as JS_RTN1 126 of FIG. 3, it should be noted that generally the DOM may be manipulated before and/or after any desired information is requested, such as from the server. For example, the DOM may be updated to display a table in the process of loading (e.g., with a loading spinner). The information may be loaded from the server and then stored in the table for display whereby the loading spinner is then removed. More generally, the particular ordering in which steps may be performed by the target body of code in connection with particular examples herein should not be construed as a limitation or requiring that particular order. Such variations will be appreciated by those skilled in the art.

It should be noted that the GUI application code 124 may or may not send any request(s) to the server 110 for information (e.g., may optionally perform S5, S6 as needed for the particular event, UI and application). Whether such requests are performed in S5 may vary with the particular UI event being processed and the information to be displayed. For example, as a simple illustration, the params communicated in S1 to the NAV service 130 may include two numeric inputs specified by the user whereby such numeric inputs may be further communicated to JS_RTN1 126 in S3A as the target body of code. The code 126 may perform processing of the two numeric inputs, such as add the two numbers, multiply the two numbers, and the like, generating a single numeric output representing the result of the mathematical operation. The numeric output may be included in the displayed content of the UI. The code 126 may dynamically modify the DOM as needed to include an element or object for the numeric output with suitable styles or attributes. However, the code of 126 may perform processing to dynamically update aspects of the GUI to include the foregoing result without requesting further information from the server 110.

Figure 3A:
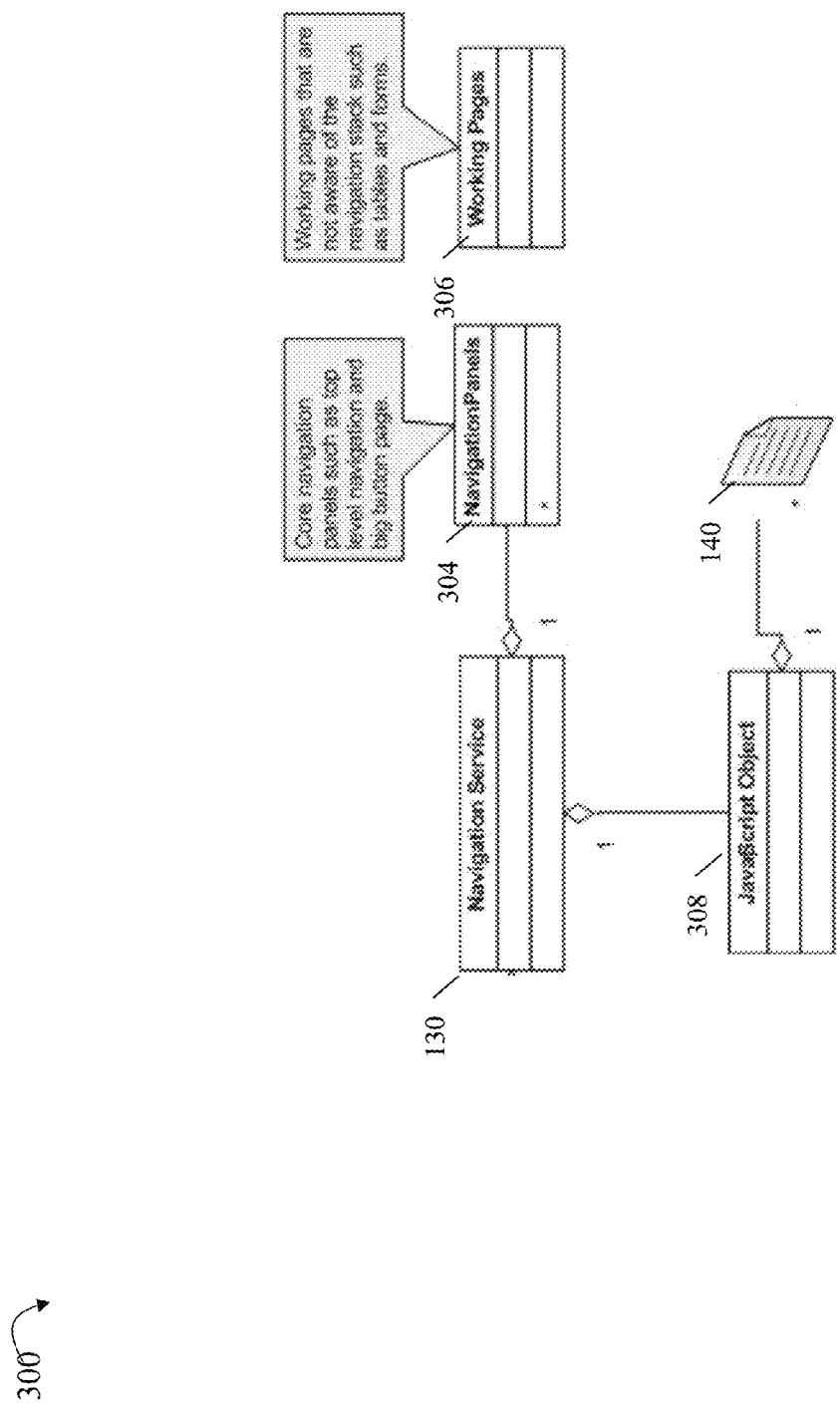
FIG. 3A is an example illustrating a high level design of entities that may be used in an embodiment in accordance with techniques herein.

In one embodiment details of which are further described below, the NAV structure file 140 may be a JSON file describing the application overall layout and navigational flow. The NAV service 130 may include JavaScript code and use an internal representation using JavaScript objects. With reference to FIG. 3A, information from the JSON file 140 such as related to a target navigation point having a NAV ID may be used to generate a JavaScript object 308 used by the NAV service 130. With the NAV service 130, information regarding core navigational panels 304 may be provided. Element 304 may represent, for example, top level navigational panels such as top level UI navigational sections of the application represented in the JSON file 140. Element 306 may represent that additional working pages or displayed content views not aware of the navigation stack such as tables and forms. In other words, element 306 may represent the content views corresponding to navigational points represented in the file 140 where code of the GUI application code 124 invoked to create such content views may be characterized as creating working pages (content views) which are not navigation aware.

It should be noted that JS_RTN2 128 of FIG. 3 may denote another body of code of the GUI application code 124. Element 128 is described in connection with other examples in following paragraphs and may perform processing similar to that as described herein connection with element 126.

Figure 4:
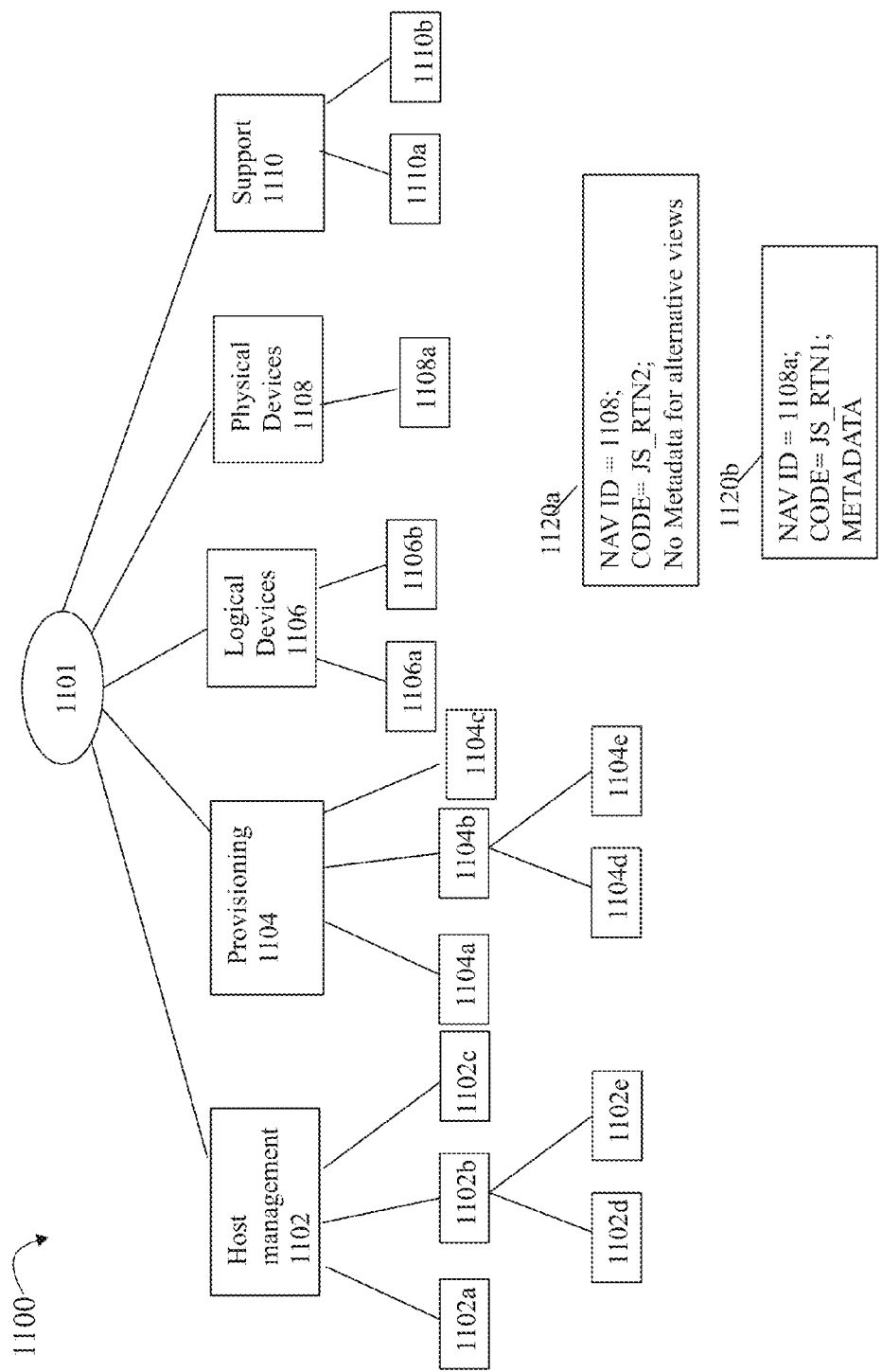
FIG. 4 is an example of a hierarchical structure and associated information that may be included in a navigational structure file in an embodiment in accordance with techniques herein.

Referring to FIG. 4, shown is an example of a hierarchical structure regarding an application's navigational UI flow that may be represented by information included in the NAV structure file 140, such as a JSON file mentioned above. The example 1100 illustrates a hierarchical structure corresponding to UI content views (e.g., portions of a display or pages) that the user may navigate from and to, such as in connection with a data storage management application. The structure 1100 in this example forms a tree having a root node 1101 at level 0, nodes 1102, 1104, 1106, 1108 and 1110 at level 1, nodes 1102a-c, 1104a-c, 1106a0b, 1108a and 1110a-b at level 2, and nodes 1102d-e, 1104d-e and 1108d-e at level 3. The example 1100 also includes examples 1120a-b of additional data that may be defined for each node in the tree structure having root 1101 Each node in the structure may be associated with a unique NAV ID as described herein. For example, element 1120a illustrates additional information that may be specified in the file 140 for the node having NAV ID 1108, and element 1120b illustrates additional information that may be specified in the file 140 for the node having NAV ID 1108a. Although information 1120a and 1120b are only illustrated for 2 nodes for simplification in illustration, information may be similarly included in the file 140 for each node of the NAV structure having root 1101. Elements 1120*a* and 1120*b* may include information similar to element 142 of FIG. 3.

A node at level N may have child nodes connect to it at level N+1. For example, nodes 1102*a-c* are child nodes of node 1102 and node 1102 is the parent node of child nodes 1102*a-c*. A node which has no child nodes is also a leaf node. A path may be defined from the root at level 0 to a second node at another level greater than 0 in the hierarchy whereby the path includes the root node and any intervening nodes traversed from the root to reach the second node. For example, a path may defined by 1101, 1106, 1106*b*. A second path may be defined by 1101, 1108 1108*a*. More generally, a path may be defined between two nodes in the tree as follows: a path between a first node at level N to a second node at a level M>N may represent a navigational path through UI displays of each node on the path. A first node may be a descendant of a second node if the second node is included in a path from the root to the first node (e.g., there are one or more intervening nodes connecting the second node to the first node where each node in the path is at a different level in the hierarchy).

Element 1101 is the root denoting that initially, the UI display may include a content view with a first level of menu options, buttons or other UI elements for host management 1102, provisioning 1104, logical devices 1106, physical devices 1108 and support 1110. Thus the nodes 1102, 1104, 1106 and 1108 at level 1 may represent the major partitioned navigational sections of the UI displays. Each of the nodes in levels 2 and 3 may represent a UI content view that may be rendered in connection with UI navigation. A user may navigate to a UI content view corresponding to a first node at level 2 by selecting the UI element corresponding to the first node's parent at level 1. A user may navigate to a UI content view corresponding to a first node at level 3 through the first node's parent at level 2. Leaf nodes, such as 1102*d*, 1102*e*, 1102*c*, 1104*a*, 1104*d*0*e*, 1104*c*, 1106*a-b*, 1108*a*, 1110*a-b* may represent content views having no links to other content views as represented by the fact that there is no further link from such leaf nodes to any other node in the tree.

A user may select a UI element associated with any one of 1102, 1104, 1106, 1108 and 1110 and result in rendering another UI content view associated with a child node of the selected node. For example with reference to FIG. 5, element 1201 may illustrate the initial UI content view corresponding to the root node 1101 including 5 UI elements 1101*a-e* such as buttons for host management, provisioning, logical devices, physical devices and support. In this example, selecting host management 1201*a* may result in a UI content view of 1202 corresponding to the node 1102 in FIG. 4. The UI content view 1202 may include 3 hyperlinks or other navigational links (such as in connection with navigating in a browser)—LINK1, LINK2, and LINK3. Selection of LINK 1 of 1202 may result in UI navigation to UI content view 1202*a*. Selection of LINK 2 of 1202 may result in UI navigation to UI content view 1202*b* having two links LINK4 and LINK 5. Selection of LINK 4 of 1202*b* may result in UI navigation to UI content view 1202*d*. Selection of LINK 5 of 1202*b* may result in UI navigation to UI content view 1202*e*. Selection of LINK 2 of 1202 may result in UI navigation to UI content view 1202*c*.

UI content views and associated UI elements associated with a single application may be partitioned into major navigational sections of the hierarchy as illustrated by the 5 groupings at level 1 of FIG. 4. Each of the LINKS 1-5 of FIG. 5 may generally represent any UI elements that a user may interact with causing transition or navigation to another content view. Thus, LINKS 1-3 may be characterized as UI elements providing navigational links to other target content views 1202*a-c* from a current content view 1202 and LINKS 4-5 may be characterized as UI elements providing navigation links to other target content views 1202*d-e*.

Figure 5:
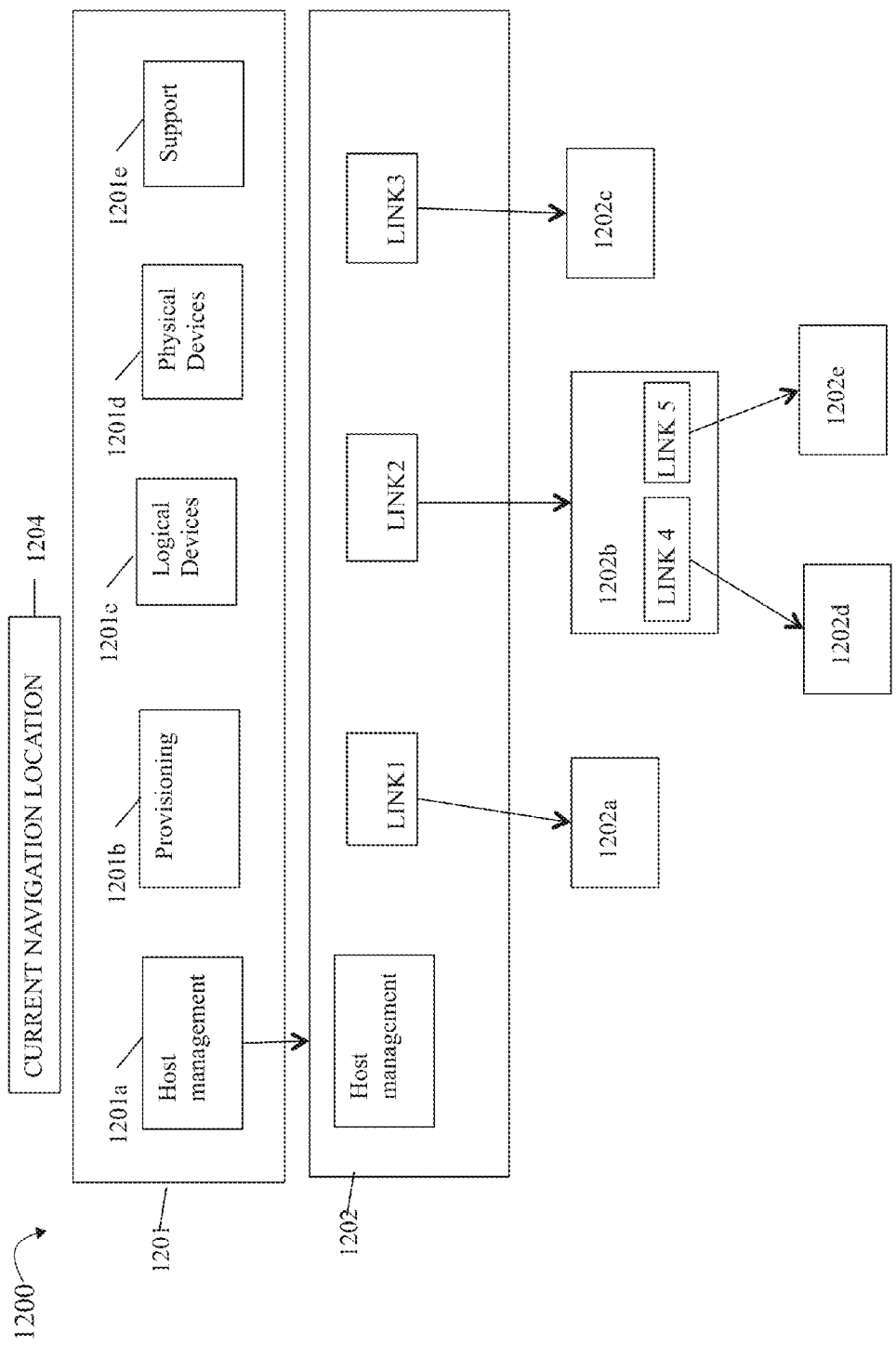
FIGS. 5-6 are examples illustrating different navigational flows and associated content views of different navigation points of an application in an embodiment in accordance with techniques herein.

The example 1200 of FIG. 5 indicates that the content views 1202*d-e* corresponding, respectively, to leaf nodes 1102*d-e* of FIG. 4 may include no UI elements providing links to other content views since, as represented in FIG. 5, such leaf nodes 1102*d-e* have no child nodes.

With reference back to FIG. 4, each node in the tree may represent a navigation point and associated content view within the application. A first navigation point may correspond to a parent node having a first content view. The parent node may have a child node representing a second navigation point for a second content view. A user may navigate from the first content view to the second content view by selecting a UI element included in the first content view. It should be noted that the rendered content may not completely change of update each time a UI element is selected. For example, the rendered content in the entire UI display at a point in time may collectively be the net result of a current or last selected UI element as well as one or more prior UI element selections. Selecting a menu option or button, for example, may result only in updated a portion of the display with a new content view. In this manner, the resulting display may include the new content view along with possibly one or more other content views or portions of such other content views.

With reference to FIG. 5, a UI display may include a UI element 1204 providing the current navigation point as a current navigation location within the hierarchy of nodes representing the different navigation points for the application. For example, after selecting 1201*a*, the current navigation location in 1204 may be "application.HostManagement" denoting the current navigation point as node 1102 of FIG. 4.

Referring back to FIG. 3, the techniques described herein may be generally used in connection with a client and server where the client may make API calls such as in the form of requests to the server. In one embodiment, the GUI application code 124 may be executed on browser 120 of a client whereby the code 124 may be JavaScript loaded from server 110. The client may be rendering a GUI in the browser 120. When processing is performed to transition or navigate between content views, the client may not load new JavaScript or HTML from the server to render each new content view (e.g., working page). In accordance with techniques herein, the GUI application code 124 may be generally written using AJAX technologies (including JavaScript) whereby any data, if needed, may be requested and obtained from the server using AJAX calls to load the data and dynamically change the DOM and other aspects of what is being rendered in the browser. The code of the GUI application 124 may be characterized as using DHTML technologies and techniques known in the art and also mentioned herein to dynamically modify the DOM and perform any necessary call(s) to the server to obtain data for display without refreshing the page. Using DHTML techniques, JavaScript may be used to dynamically modify the existing HTML code and associated structure of the DOM which may be populated with new data obtained from the server without requesting and obtaining an entirely new web page. Techniques herein may dynamically manipulate the DOM defining the document body of the displayed web page, for example, to dynamically add and remove objects from the DOM. The client-side executing JavaScript may create and/or modify objects or elements of the DOM on the client dynamically and perform AJAX calls to obtain data.

Figure 6:
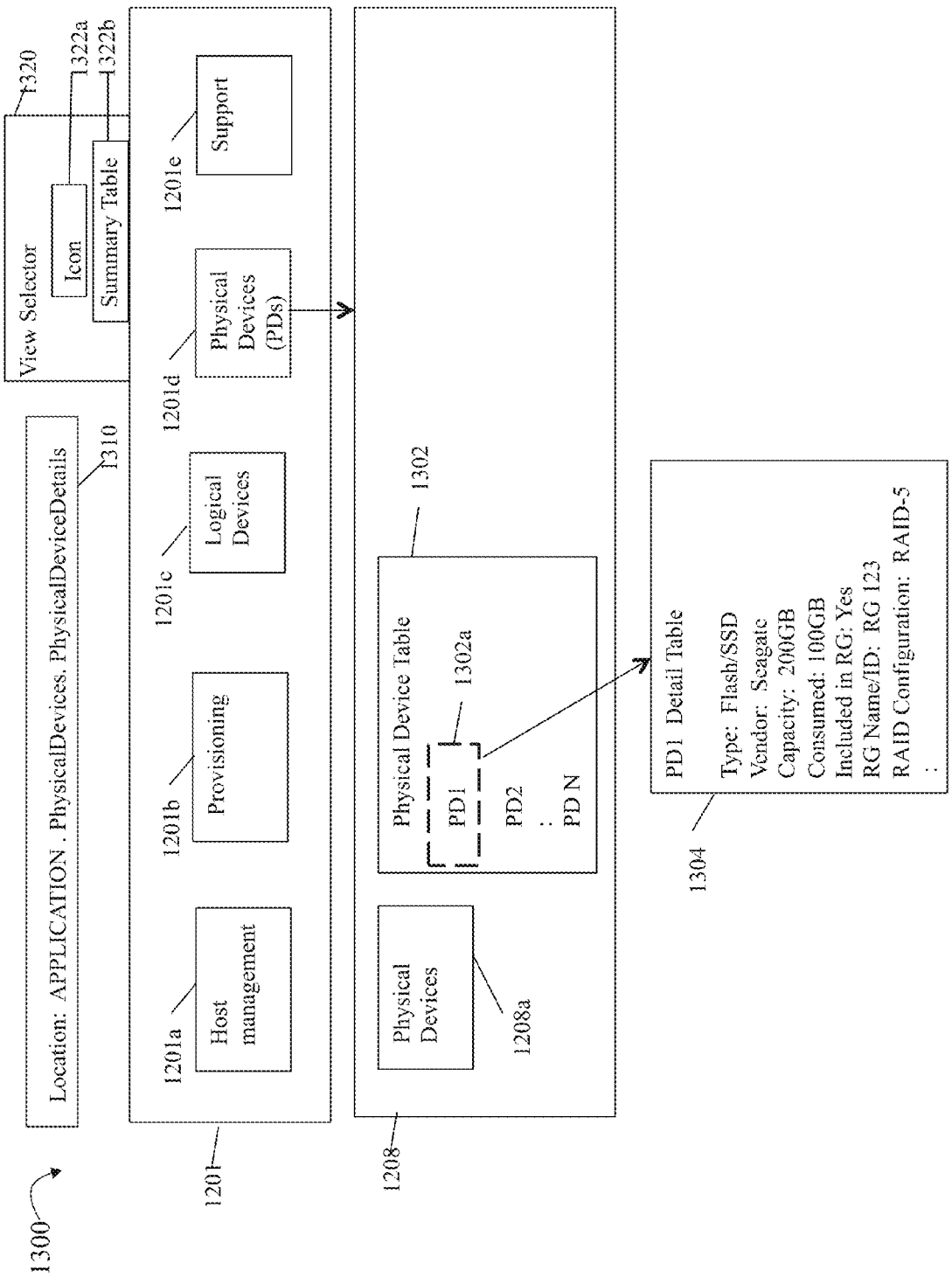

Referring to FIG. 6, shown is an example 1300 illustrating use of techniques described herein. Element 1201 may represent the content view corresponding to node 1101 of the exemplary NAV structure file of FIG. 4. The content view of 1201 may be initially displayed when the data storage management application starts. A user may select UI element 1201*d* to display a list of physical devices (PDs) in the form of a PD table. Element 1201 and 1201*a-e* may be as described above in connection with FIG. 5. Elements 1201*a-e* may be buttons or tabs. In response to selection of UI element 1201*d*, the web browser 120 may perform step S1 of FIG. 3 to notify the NAV service 130 providing context information identifying the particular UI element 1201*d* selected. It should be noted that the information provided in S1 to the NAV service may be the NAV ID for the UI element 1201*d* selected or may otherwise be information that the NAV service uses to indirectly determine the corresponding NAV ID for UI element 1201*d*. The NAV ID as described herein may identify a target content view to be displayed and may denote a navigational point represented by an object or node included in the structure of FIG. 4. In this example, the NAV ID may identify the node 1108 of FIG. 4 having an associated content view 1208 of FIG. 6. Element 1120*a* of FIG. 4 identifies the information the NAV service obtains (S2) from the NAV structure file 140 for the identified NAV ID=1108. Element 1120*a* may identify JS_RTN2 128 as the target code of the GUI application code 124 to which control is transferred. Element 1120*a* may include no metadata for alternative views meaning that there are no alternative views available or specified for NAV ID 1108 In this case, the NAV service performs S3 and transfers control to JS_RTN2 128. JS_RTN2 128 may perform processing similar to S4 as described in connection with element 126. JS_RTN2 may modify aspects of the UI needed to create the content view 1208 including table 1302 and also obtain the data from the server 110 needed to populate the table 1302. JS_RTN2 128 may include JavaScript to dynamically define a new table structure and object in the DOM for table 1302 and also dynamically set any appropriate styles or attributes. Additionally, the code of 128 may also create a text box UI element 1208*a* with the text "Physical Devices". The code of 128 may issue a request S5 to the server 110 to obtain a list of PD identifiers (e.g., PD1, PD2, . . . PD N) used to populate the physical device table 1302.

A user may then select a UI element displayed in 1208. In this example, the user may select an element 1302*a* of the PD table 1302 for PD1 as illustrated. In response to selecting 1302*a*, the browser 120 may notify S1 the NAV service 130 whereby the NAV service is passed information identifying the UI element 1302 as well as the particular table entry or element 1302*a* for PD1. In this example, assume the NAV service receives a row ID of 1 denoting the particular entry or element 1302*a* selected. The NAV service 130 may obtain S2 from the file 140 the information of 1120*b* of FIG. 4 for the NAV ID 1108*a* corresponding to the table 1302 (UI element selected in the current content view 1208) and also denoting the target UI content view 1304 (represented by node or navigational point 1108*a*). Element 1120*b* of FIG. 4 identifies the information the NAV service obtains (S2) from the NAV structure file 140 for the identified NAV ID=1108*a*. Element 1120*b* may identify JS_RTN1 126 as the target code of the GUI application code 124 to which control is transferred. Element 1120*b* may include metadata that is alternative view information metadata describing the available alternative views for displaying the information for the selected physical device, PD1, from the PD table 1302. In this example, assume that the metadata of 1120*b* indicates available views of detail table, icon and summary table. Detail table view may display detailed information regarding PD1 in a table. Summary table view may provide summary information regarding PD1 in a table. Icon view may display an icon with minimum information, such as amount of consumed storage with respect to total storage capacity for the selected PD1. The detail table view may be further indicated by the metadata in 1120*b* as the default view and have a format and content as illustrated by 1304 of FIG. 6. In this example, PD1 is selected 1302*a* and identifies the particular PD for which details are to be displayed. The NAV service may transfer control S3A to JS_RTN1 126 providing parameters identifying the selected PD1, identifying the 3 available views of detail table, summary table and icon, and also identifying the default view of detail table.

JS_RTN1 126 may perform processing similar to S4 as described elsewhere herein. JS_RTN1 may modify aspects of the UI needed to create the content view 1304 including details table 1304 for the default view and also obtain the detailed information for the particular PD1 from the server 110 needed to populate the table 1304. JS_RTN1 126 may include JavaScript to dynamically define a new details table structure and object in the DOM for table 1304 and also dynamically set any appropriate styles or attributes. Additionally, the code of 126 may issue a request S5 to the server 110 to obtain detailed information for PD1 (e.g., the particular PD identified by parameters provided in S3A) used to populate the physical device details table 1304 (corresponding to content view and navigation point 1108*a* of FIG. 4). Thus, JS_RTN1 126 performs processing to display data in the user interface in accordance with the default view of detail table in this example.

It should be noted that the same target body of code JS_RTN1 may be invoked to provide PD detailed information for any selected PD of the table 1302 whereby the parameter(s) passed to JS_RTN1 may identify the selected PD.

In connection with the foregoing example of FIG. 6, the target body of code JS_RTN2 may implicitly know the object or other entity used to identify a physical device table based on when JS_RTN2 is expected to be invoked. In other words, as described above, JS_RTN2 may be a target body of code which only retrieves and displays the physical device table and not other tables of data. As a variation, JS_RTN2 may be a more generally or generically written target body of code that retrieves and displays other tables of data (e.g., may display a physical device table, LUN or logical device table, storage group table, RAID group table, and the like) whereby one of the parameters passed to JS_RTN2 may identify the particular table to be displayed. Similarly, the target body of code JS_RTN1 described above may be more generally written than as described above and the parameters may identify the particular selected table entry (as described above) and similarly include an additional parameter identifying the physical device table (as distinguished from other possible types of tables of information).

Element 1310 represents the UI element displaying the current navigation location within the application responsive to navigating to node 1108*a* in the application as represented in FIG. 4. Additionally, as described above, the code for JS_RTN1 126 may also perform processing to display UI elements for other available alternative views available for the current navigation point. In this example, the default and current view of detail table is used to display the information 1304 for the selected PD1. However, other available alternative views for the current navigation point are summary table and icon. The user interface 1300 may include a view selector panel 1320 including buttons or other UI elements 1322a-b denoting the two additional available views of icon 1322a and summary table 1322b.

If a user desires to further customize his/her view for the particular navigation point to be a view other than the default of detail table view in this example, the user may then select one of 1322a or 1322b. For the particular user, a set of user preferences may be persisted or stored for particular navigation points. Responsive to selecting 1322a, a new user preference or user-specific default view of icon may be specified for the navigation point represented by 1108a in FIG. 4. Additionally responsive to selecting 1322a, the data for the selected PD1 may be accordingly updated from the detail table view 1304 to a revised icon view and the view selector panel 1320 may be updated to denote other available views of detail table and summary table (e.g., identify other available views besides the current user preference view of icon for the navigation point 1108a). In a similar manner, responsive to selecting 1322b, a new user preference or user-specific default view of summary table may be specified for the navigation point represented by 1108a in FIG. 4. Additionally responsive to selecting 1322b, the data for the selected PD1 may be accordingly updated from the detail table view 1304 to a revised summary table view and the view selector panel 1320 may be updated to denote other available views of detail table and icon (e.g., identify other available views besides the current user preference view of summary table for the navigation point 1108a).

The user may also not select 1322a or 1322b and instead desire the current detail table view. In this case, absent selection of 1322a or 1322b, the NAV file default of "detail table" may be stored as the user preference for the navigation point for the particular user. The next time the same user navigates to the same navigation point 1108a, the user preferences for the user may be read to determine the particular user's customized view for displaying information for the navigation point for the user. In a similar manner, a set of user preferences may be stored for each individual user of the application. A single set of user preferences for a single user may include multiple view preferences for multiple different navigation points. For example, a first set of user preferences for user 1 may include a first view preference for a first navigation point and a second view preference for a second navigation point. This is illustrated in more detail elsewhere herein.

It should be noted that changing the view selected for a particular navigation point in the application does not change the location (e.g., no change to location denoted by 1310). Rather, changing the view from detail table 1304 to a different view of either icon or summary table alters the displayed view of the data associated with the particular navigation point. Thus, the alternative available views associated with the same navigation point represent different alternative ways of displaying the data associated with the same navigation point. It should be noted that with the different alternative views, the data associated with the same PD1 may be presented in different forms. Additionally, depending on the view, different portions of the data associated with PD1 may be displayed.

Figure 7A:
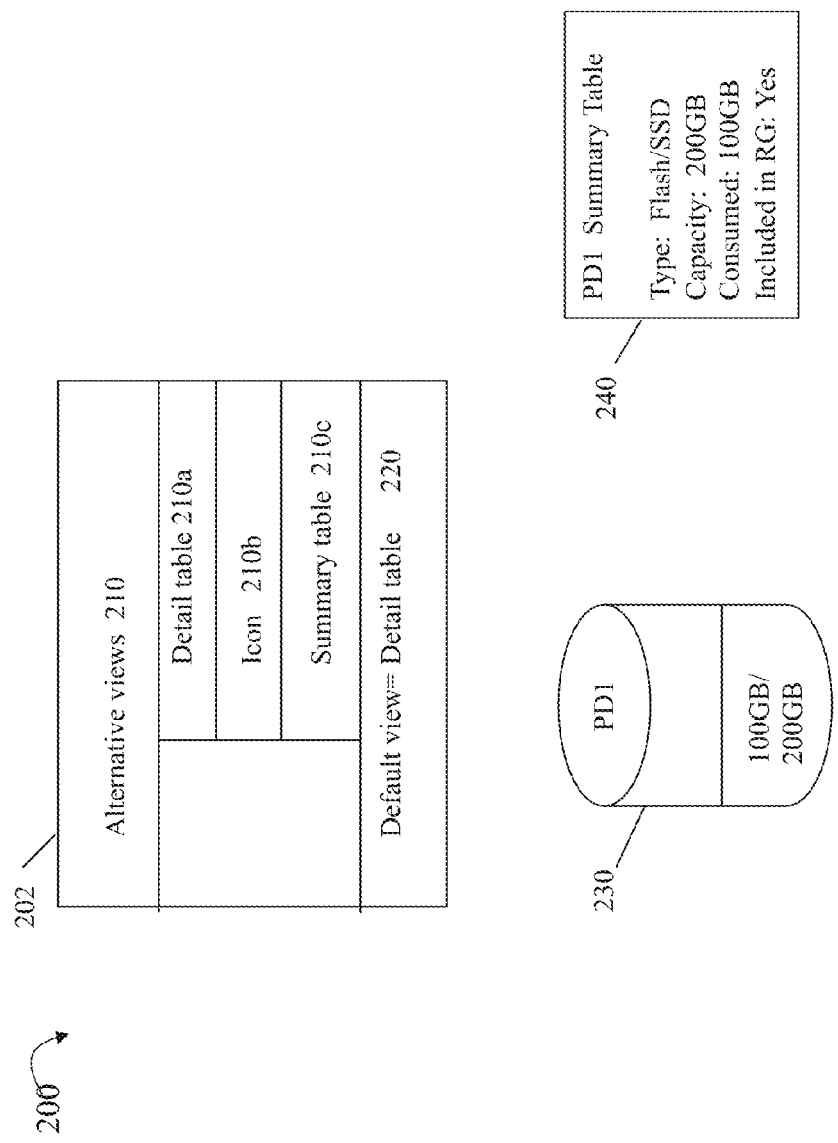
FIG. 7A is an example illustrating metadata and associated alternative views that may be included in an embodiment in accordance with techniques herein.

Referring to FIG. 7A, shown is an example 200 of metadata that may be used in connection with techniques herein to specify alternative view information. Such metadata may be included or otherwise denoted by information in the file 140 of FIG. 3 as described herein which is used to denote the available alternative views and also denote a default one of the views. The metadata may be generally characterized as a data descriptor identifying a format, layout or presentation of data associated with a particular NAV ID.

Element 202 may represent the information described by the metadata for a particular NAV ID in the NAV file 140 of FIG. 3. The metadata 202 may identify the available alternative views 210 and may also identify which of the available views of 210 is the default. Element 202 includes metadata that may be specified in 1120b for NAV ID 1108a in connection with the example of FIG. 6 with available alternative views 210 including detail table view 210a, icon view 210b and summary table view 210c where the default view 220 is the detail table view. Element 1304 of FIG. 6 may represent the detail table view (as identified by 210a and 220) for a selected PD such as PD1. Element 1304 may provide the most detailed informational view for PD1 and include, for example, the type of physical storage media as flash or a solid state drive (SSD), total storage capacity of 200 GB, consumed capacity of 100 GB, identify whether the PD is included in a RAID group, and if so, provide information regarding the RAID group (e.g., RAID group name or identifier, RAID protection level).

Element 230 of FIG. 7A may represent the icon view 210b for PD1 denoting an image for the physical device which is labeled "PD1" to identify the selected PD. The icon 230 further denotes the amount of consumed storage of 100 GB relative to the total capacity of 200 GB for PD1. The icon 230 also graphically illustrates the amount of consumed storage for the selected PD1. Element 240 illustrates information that may be displayed for PD1 when the summary table view 210c is selected. As illustrated by 240, the summary table includes a portion of the total available detailed information as included in 1304 for the detail table view. It should be noted that each of 1304, 230 and 240 provide alternative views for displaying information about the same selected physical device, PD1. When storing a user view preference, the view preference may be further reused when displaying information for the same navigation point even with a different selected PD other than PD1.

It should also be noted that the particular available alternative views suitable for a navigation point may vary with the data being displayed. For example, a graph may not be a suitable view format for data in connection with FIG. 6. However, possible views of a table and graph may be suitable for displaying other types of data, such as when displaying performance data (e.g., such as average response times, I/O throughput, and the like for different time periods). Additionally, a view preference for a particular user may be selected based on other criteria besides a user manual selection. For example, a view preference for a user may be specified automatically based on a user skill level, role defined for the particular user with the application, and the like. The NAV file may specify different views to use with different skill levels, roles, and the like. For example, rather than have a single default view in 220, an embodiment may specify multiple default views each of which is associated with a different user skill level, user role, and the like. To further illustrate, 220 of FIG. 7A may include defaults where a user having a novice or beginner skill level may have a default view of icon 230 and a user having an expert or advanced skill level may have a default view of detail table 1304. The particular skill level of a user may be determined in any suitable manner such as by manually assigning a skill level to a user, automatically determining or adjusting the skill level of a user based on interactions and a history of actions performed in connection with the application and other activities, and the like.

Figure 7B:
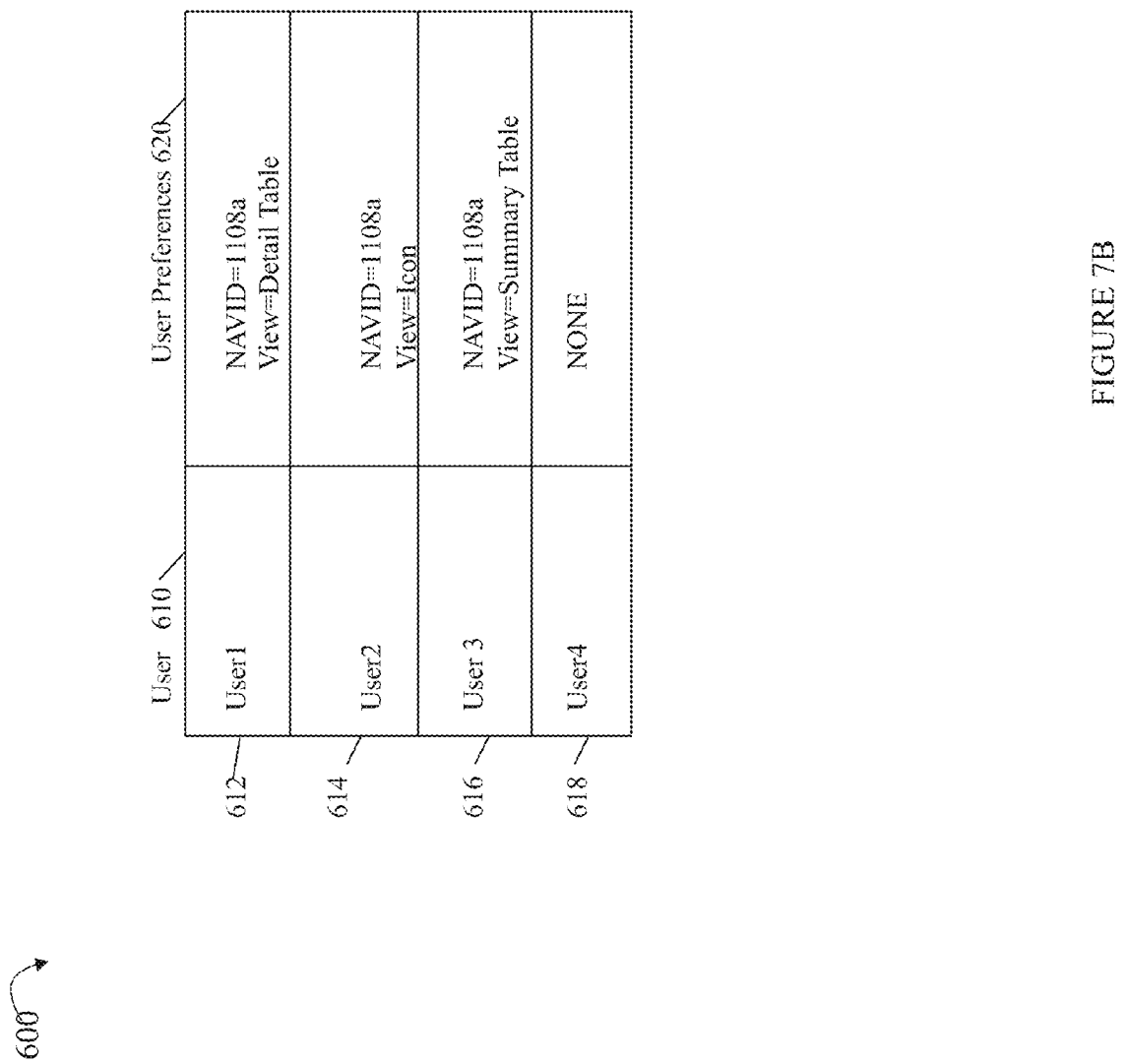
FIG. 7B is an example illustrating information that may be stored in connection with user preferences of selected configurable views for navigation points of an application in an embodiment in accordance with techniques herein.

Referring to FIG. 7B, shown is an example illustrating user preferences that may be stored and used in an embodiment in accordance with techniques herein. The example 600 includes a table with a set of user preferences stored for each user. For a single row of table 600, column 610 denotes the user and column 620 denotes the user preferences for the particular user identified in column 610 of that row. Element 612 denotes user preferences for user 1 where the user preferences indicate a preferred view of detail table when displaying information in connection with NAV ID 1108a. Element 614 denotes user preferences for user 2 where the user preferences indicate a preferred view of icon when displaying information in connection with NAV ID 1108a. Element 614 denotes user preferences for user 3 where the user preferences indicate a preferred view of summary table when displaying information in connection with NAV ID 1108a. Element 616 denotes user preferences for user 4 where, in this case, no user preferences are yet specified in connection with user 4. Element 616 may denote the case, for example, where user 4 is a new user of the application. As described herein, an embodiment may save as a user preference the last view used when a user has visited a particular page or navigation point in the application. The user preference for a navigation point may be updated responsive to selecting a UI element such as 1322a or 1322b indicating a preferred view for the user.

Described herein are techniques for alternative view-based navigation using the NAV file to define the configuration and UI or navigation flow of the application. The NAV file describes a hierarchical structure of the application where each node in the structure is a location to which the user may navigate. For each node and corresponding navigation point, a user may want to display data using any one of different available alternative views. Different alternative views may include graph, table, detail, icon, and the like, as described herein. Alternative view descriptors may be optional and user-configurable, per user, for each node or navigation point. Information regarding the possible alternative views or ways of displaying the data associated with a node, as well as a default view, may be represented using additional metadata associated with each node in the NAV file 140. Thus, the same NAV ID (e.g., application location or navigation point) may be associated with multiple possible alternative views. In this manner, a user may bookmark a page or location in the application whereby the bookmarked navigation location may also be associated with a user-configurable preference setting in which a user can further customize a view preference for each individual navigation point. In this manner, when a user links to or launches to a particular navigation point (e.g., location) as represented in the NAV structure file for the application, an optional user-configurable view descriptor may be used to further customize the displayed data associated with that navigation point. When selecting an alternate view at runtime for the application, this selection may be automatically persisted for the current user so that when the same user returns to the same location or navigation point in the application, the view last selected by the user may be automatically used.

Figure 8:
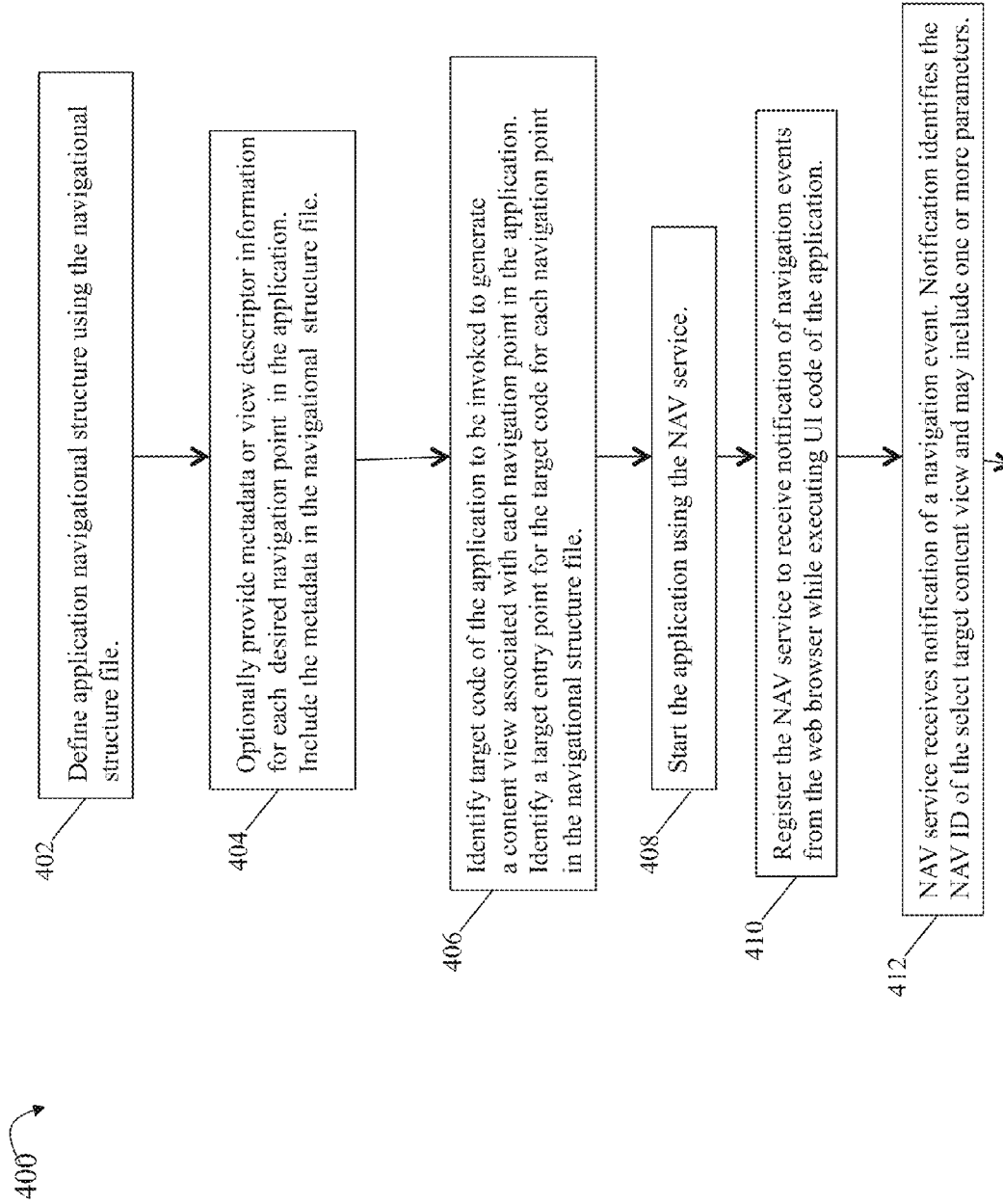
FIGS. 8-9 are flowcharts of processing steps that may be performed in an embodiment in accordance with techniques herein.
Figure 9:
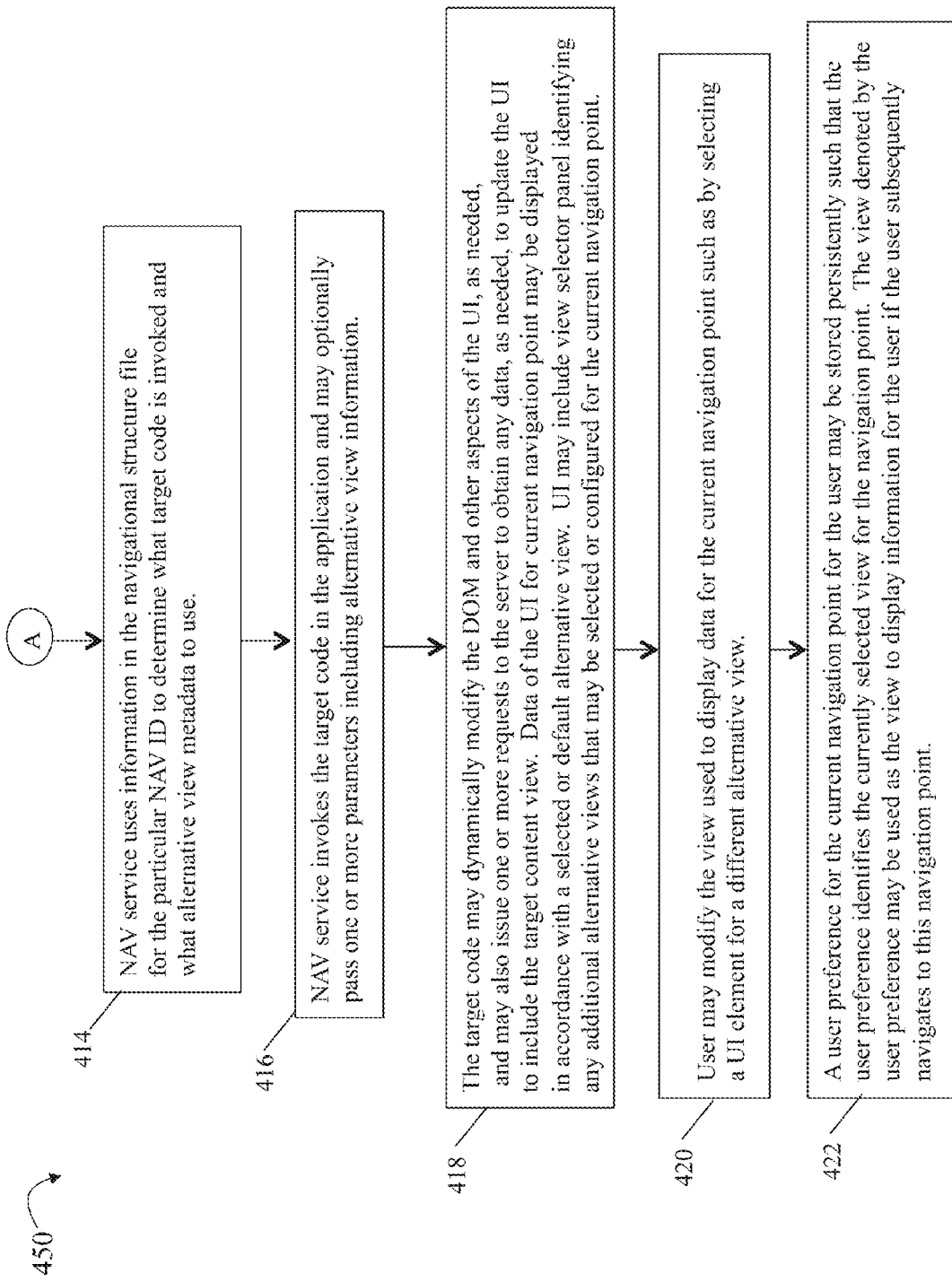

Referring to FIGS. 8 and 9, shown are flowcharts of processing steps that may be performed in an embodiment in accordance with techniques herein. The flowcharts 400,450 summarize processing described above. At step 402, an application's navigational structure is defined and included in the navigational structure file (e.g., 140 of FIG. 3 having a structure such as illustrated in FIG. 4). At step 404, metadata or alternative view descriptor information may be optionally provided for each desired navigation point in the application. Such metadata may be included in the navigational structure file and associated with a node in the described hierarchical structure representing each navigation point and associated content view. At step 406, target code of the application is identified where the target code is to be invoked to generate a content view associated with a particular navigation point in the application. A target entry point of such target code is identified for each navigation point and included in the navigational structure file. At step 408, the application using the NAV service may be started. At step 410, the NAV service registers to receive notification of desired events, such as navigation events, from the web browser while executing UI code of the application. At step 412 the NAV service receives notification of a navigation event from the web browser executing the application UI code. The notification may identify a NAV ID and one or more parameters. The NAV ID may identify the target content view to be displayed and also the UI element selected which navigates to such target content view. At step 414, the NAV service uses information in the navigational structure file for the particular NAV ID to determine what target code is invoked and what metadata to use in connection with the alternative view information for the NAV ID. At step 416, the NAV service invokes the target code in the application may pass one or more parameters as input to the target code. Such parameters may include the alternative view information for the NAV ID and may identify the available alternative views as well as a default view. At step 418, the target code may dynamically modify the DOM and other aspects of the UI, as needed, and may also issue one or more requests to the server to obtain any data, as needed, to update the UI to include the target content view. Data of the UI for current navigation point may be displayed in accordance with a selected or default alternative view. UI may include view selector panel identifying any additional alternative views that may be selected or configured for the current navigation point. Steps 412, 414, 416 and 418 may be repeated for each navigation event about which the NAV service is notified by the web browser for the application.

At step 420, the user may modify the view used to display data for the current navigation point such as by selecting a UI element for a different alternative view (e.g. selecting one of 1322a or 1322b in FIG. 6). At step 422, a user preference for the current navigation point for the user may be stored persistently such that the user preference identifies the currently selected view for the navigation point. The view denoted by the user preference for the navigation point may be used as the user's new default view to display information for the user if the user subsequently navigates again to this same navigation point. In a similar manner, the user preference for a navigation point may be repeatedly modified or updated. By default, if a user does not otherwise designate a new viewing preference for a navigation point visited by the user, an embodiment may store the default for the navigation point as denoted in the NAV file 140 as the user preference. In this manner, last view utilized by a user when visiting a navigation point may be once again used should the user subsequently navigate to the same navigation point.

Although exemplary uses herein may be made with reference to particular UI elements, it will be appreciated that techniques herein may be used in connection with any suitable UI element of an interface. UI elements may include, for example, a menu, a menu bar, a menu item, a text box, a button (e.g., radio button, cycle button), a wizard, a navigation section including one or more hyperlinks, a table, a drop-down list, a list box, a check box, a dialog box, and a combo box. Menus allow the user to execute commands by selecting from a list of choices. Menu options are selected, for example, with a mouse or other pointing device within a GUI. A keyboard may also be used. A menu may be, for example, a pull-down menu displayed in response to a user selection. A menu bar may be displayed horizontally across the top of the screen and/or along the tops of some or all windows. A software wizard is a UI type that presents a user with a sequence of dialog boxes that lead the user through a series of well-defined steps. A text box may be a box in which to enter text or numbers. A hyperlink may be displayed as text with some visual indicator (such as underlining and/or color) indicating that selecting the link will result in linking or displaying another screen or page. Properties of a hyperlink may relate to whether the hyperlink is enabled, disabled or hidden. If enabled, the particular path or location identifying a website or the web page may be displayed in response to selection of the hyperlink. A drop-down list may be a list of items from which to select. The list normally only displays items when a special button or indicator is selected. A list box allows a user to select one or more items from a list contained within a static, multiple line text box. A combo-box may be a combination of a drop-down list or list box and a single-line textbox, allowing the user to either type a value directly into the control or choose from the list of existing options. A check box indicates an "on" or "off" state via a check mark ☑ or a cross ☒. A radio butting is similar to a check-box, except that only one item in a group can be selected. Its name comes from the mechanical push-button group on a car radio receiver. Selecting a new item from the group's buttons also deselects the previously selected button. A cycle button is a type of button that cycles its content through two or more values, thus enabling selection of one from a group of items. A table may also be referred to as a grid in which numbers and/or text may be displayed in rows and columns. The foregoing are some examples of UI elements that may be supported in an embodiment in accordance with techniques herein.

Using techniques herein, UI content (e.g., strings), settings of style-based properties and other properties related to UI controls may be dynamically modified such as by code of a target body of code of the application invoked to provide customization and dynamic modification of UI element attributes (e.g., to disable or hide any/all UI elements such as by setting the property of a particular UI element to a value denoting the selected state of enabled, disabled or hidden. The properties may relate, for example, visual aspects of displayed text or content (e.g. font, text size, bolded/not bolded, italicized/not italicized), display state (e.g., enabled/disable/hide) of a UI element, an ordering of displayed elements or text (left to right, right to left, ordering of menu items such as displayed in pull-down menu, size or physical dimensions of a UI element (e.g., width, height), location/position of button on UI display (e.g., may be an absolute or relative location as displayed), sort ordering of buttons or UI element on screen, ordering or position of displayed text in table, listing of UI elements, and the like.)

In one embodiment, the NAV service as described herein may be implemented using an object model including JavaScript objects. In connection with invoking or transferring control to a target body of code of the application (e.g., such as elements 126, 128 of FIG. 3), an object in the model used by the NAV service may be created whereby a method may be specified for the object which is the target body of code. Placement of the object in the object model of the NAV service may result in invoking and transfer of control to the target body of code.

An embodiment may implement the techniques herein using code executed by a processor. For example, an embodiment may implement the techniques herein using code which is executed by a processor. As will be appreciated by those skilled in the art, the code may be stored on a computer-readable storage medium having any one of a variety of different forms including volatile and nonvolatile, removable and non-removable media implemented in any method or technology for storage of information such as computer readable instructions, data structures, program modules or other data. Computer-readable storage media (also referred to as computer readable media or medium) may include, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of event processing comprising:
receiving notification at a navigation service of a first event regarding an interaction with a user interface element of a user interface of an application, said notification including a set of one or more parameters describing context information about the notification, said set of one or more parameters including information identifying a navigation point in the application;
responsive to receiving the notification, performing first processing by the navigation service, the first processing including:
identifying first target code of the application to be invoked for updating the user interface to include a content view associated with the navigation point;
identifying a plurality of alternative views associated with the navigation point and a first of the plurality of alternative views as a default view for the navigation point, each of said plurality of alternative views identifying a different way in which data of the content view for the navigation point is displayed in the user interface; and
transferring control to the first target code to update the user interface whereby additional information indicating the first alternative view and the plurality of alternative views are provided as inputs to the first target code, wherein said first target code displays data for the navigation point in accordance with the first alternative view;
displaying a set of one or more user interface elements, each user interface element in the set representing a different one of the plurality of alternative views;
selecting, for a first user, a first user interface element from the set displayed, said first user interface element representing a second of the plurality of alternative views; and storing a first user preference for the first user whereby the first user preference indicates the second alternative view as a customized user configurable view used when subsequently displaying data associated with the navigation point for the first user.

2. The method of claim 1, wherein a navigational structure file is provided as an input to the navigation service, said navigational structure file including a description of a hierarchical structure describing the navigational flow of the application, said hierarchical structure including objects corresponding to different navigation points of the application whereby interaction with a user interface element causes transition or navigation from a first navigation point of the application to a second navigation point of the application as described in the hierarchical structure.

3. The method of claim 2, wherein each navigation point of the application is represented by a node in the hierarchical structure, said each navigation point being associated with a content view.

4. The method of claim 3, wherein the hierarchical stricture forms a tree structure of a plurality of nodes corresponding to a plurality of navigation points of the application, said tree structure including a plurality of levels, each of said plurality of levels including one or more nodes, said tree structure including a root node at first level and one or more nodes at one or more other levels, and one or more leaf nodes.

5. The method of claim 4, wherein a first content view is associated with a first node that is not a leaf node and represents a first navigation point of the hierarchical structure, said first content view including a first user interface element which, when selected, results in navigation to a second content view associated with a second node representing a second navigation point of the hierarchical structure.

6. The method of claim 5, wherein the first node is a parent node of the second node, and the second node is a child node of the first node.

7. The method of claim 3, wherein the hierarchical structure of the navigational structure file includes a first node representing said navigation point and the content view, and wherein the navigational structure file includes information for the first node whereby the information for the first node includes data identifying the first target code of the application and identifying the plurality of alternative views.

8. The method of claim 1, wherein, if said selecting to select one of the user interface elements of the first set is not performed for the first user, and where if data for the navigation point is also currently displayed in accordance with the first alternative view, then the first alternative view is stored as the first user preference for the navigation point.

9. The method of claim 1, wherein the first event is caused by the first user navigating to the navigation point at a first point in time and wherein the first user subsequently navigates again to the navigation point at a second point in time after said storing thereby causing a second event, and the method further comprises:
receiving a second notification of the second event, said second notification including a second set of one or more parameters describing context information about the second notification, said second set of one or more parameters including information identifying the navigation point in the application; and
responsive to the second event occurrence, displaying information associated with the navigation point in accordance with the first user preference for the first user thereby causing information associated with the navigation point to be displayed on the user interface in accordance with the second alternative view.

10. The method of claim 1, wherein, prior to performing said storing, the first target code performs a call to a server to request first data associated with the navigation point, wherein the first data is then displayed to the first user in accordance with the first alternative view as part of said displaying information for the navigation point to the first user.

11. A method for providing alternative view-based navigation of an application, the method comprising:
receiving a navigational structure file including a description of a hierarchical structure for a navigational flow of the application, said hierarchical structure including nodes corresponding to different navigation points of the application whereby interaction with a user interface element causes transition or navigation from a first navigation point of the application to a second navigation point of the application as described in the hierarchical structure, wherein said navigational structure file includes first information for a first node of the hierarchical structure whereby the first node represents the first navigation point in the application, said first information identifying a plurality of alternative views of data displayed in connection with the first navigation point and said first information indicating a first of the plurality of alternative views as a default view for displaying data in connection with the first navigation point;
receiving notification of a first event regarding an interaction with a user interface element of the user interface whereby the first event is a request to navigate to the first navigation point;
responsive to receiving the notification, performing first processing to display information for the first navigation point of the application in a user interface, said first processing including:
retrieving, from the navigational structure file, said first information; and
displaying data associated with the first navigation point in accordance with the default view of the first information;
displaying a set of one or more user interface elements, each user interface element in the set representing one of the plurality of alternative views besides the default view;
selecting, from the user interface by a first user, a first user interface element from the set displayed, said first user interface element representing a second of the plurality of alternative views; and
storing a first user preference for the first user whereby the first user preference indicates the second alternative view as a customized user configurable view used when subsequently displaying data associated with the first navigation point for the first user.

12. The method of claim 11, wherein the plurality of alternative views for displaying data in connection with the first navigation point includes any of a table, an icon, an image, a graph, a chart, a detailed view of information associated with the first navigation point, a summary view of information associated with the first navigation point, and a selection of data in accordance with a skill level or role.

13. The method of claim 11, wherein a bookmark denoting the first navigation point is specified for the first user whereby, when the first user initially starts the application in a subsequent second session, the bookmark denoting the first navigation point of the application is loaded as a current starting location within the application and data for the first navigation point is displayed in accordance with the second alternative view stored in the first user preference for the first user.

14. A non-transitory computer readable medium comprising code stored thereon that when executed, performs a method of providing alternative view-based navigation of an application comprising:
  receiving a navigational structure file including a description of a hierarchical structure for a navigational flow of the application, said hierarchical structure including nodes corresponding to different navigation points of the application whereby interaction with a user interface element causes transition or navigation from a first navigation point of the application to a second navigation point of the application as described in the hierarchical structure, wherein said navigational structure file includes first information for a first node of the hierarchical structure whereby the first node represents the first navigation point in the application, said first information identifying as plurality of alternative views of data displayed in connection with the first navigation point and said first information indicating a first of the plurality of alternative views as a default view for displaying data in connection with the first navigation point;
  receiving notification of a first event regarding an interaction with a user interface element of the user interface whereby the first event is a request to navigate to the first navigation point;
  responsive to receiving the notification, performing first processing to display information for the first navigation point of the application in a user interface, said first processing including:
    retrieving, from the navigational structure file, said first information; and
    displaying data associated with the first navigation point in accordance with the default view of the first information;
  displaying a set of one or more user interface elements each user interface element in the set representing one of the plurality of alternative views besides the default view;
  selecting, from the user interface by a first user, a first user interface element from the set displayed, said first user interface element representing a second of the plurality of alternative views; and
  storing a first user preference for the first user whereby the first user preference indicates the second alternative view as a customized user configurable view used when subsequently displaying data associated with the first navigation point for the first user.

15. The non-transitory computer readable medium of claim 14, wherein the plurality of alternative views for displaying data in connection with the first navigation point includes any of a table, an icon, an image, a graph, a chart, a detailed view of information associated with the first navigation point, a summary view of information associated with the first navigation point, and a selection of data in accordance with a skill level or role.

16. The non-transitory computer readable medium of claim 14, wherein a bookmark denoting the first navigation point is specified for the first user whereby, when the first user initially starts the application in a subsequent second session, the bookmark denoting the first navigation point of the application is loaded as a current starting location within the application and data for the first navigation point is displayed in accordance with the second alternative view stored in the first user preference for the first user.

17. A non-transitory computer readable medium comprising code stored thereon that, when executed, performs a method of event processing comprising:
  receiving notification at a navigation service of a first event regarding an interaction with a user interface element of a user interface of an application, said notification including a set of one or more parameters describing context information about the notification, said set of one or more parameters including information identifying a navigation point in the application;
  responsive to receiving the notification, performing first processing by the navigation service, the first processing including:
    identifying first target code of the application to be invoked for updating the user interface to include a content view associated with the navigation point;
    identifying a plurality of alternative views associated with the navigation point and a first of the plurality of alternative views as a default view for the navigation point, each of said plurality of alternative views identifying a different way in which data of the content view for the navigation point is displayed in the user interface; and
    transferring control to the first target code to update the user interface whereby additional information indicating the first alternative view and the plurality of alternative views are provided as inputs to the first target code, wherein said first target code displays data for the navigation point in accordance with the first alternative view;
  displaying a set of one or more user interface elements, each user interface element in the set representing a different one of the plurality of alternative views;
  selecting, for a first user, a first user interface element from the set displayed, said first user interface element representing a second of the plurality of alternative views; and
  storing a first user preference for the first user whereby the first user preference indicates the second alternative view as a customized user configurable view used when subsequently displaying data associated with the navigation point for the first user.

* * * * *